United States Patent
Ikenaka et al.

(10) Patent No.: US 7,304,935 B2
(45) Date of Patent: Dec. 4, 2007

(54) OPTICAL PICKUP DEVICE AND CORRECTING ELEMENT USED IN THE OPTICAL PICKUP DEVICE

(75) Inventors: Kiyono Ikenaka, Hino (JP); Shinichiro Saito, Hachioji (JP); Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 569 days.

(21) Appl. No.: 10/976,845

(22) Filed: Nov. 1, 2004

(65) Prior Publication Data

US 2005/0094538 A1    May 5, 2005

(30) Foreign Application Priority Data

Nov. 4, 2003    (JP)    ............................. 2003-374616

(51) Int. Cl.
*G11B 7/00*    (2006.01)

(52) U.S. Cl. ............................. 369/112.08; 369/112.04
(58) Field of Classification Search ........... 369/112.08, 369/112.04
See application file for complete search history.

(56) References Cited

U.S. PATENT DOCUMENTS

| | | | |
|---|---|---|---|
| 6,950,384 B2 * | 9/2005 | Arai et al. | 369/121 |
| 7,133,332 B2 * | 11/2006 | Kimura | 369/44.32 |
| 7,151,735 B2 * | 12/2006 | Arai et al. | 369/112.05 |
| 7,173,895 B2 * | 2/2007 | Arai et al. | 369/112.05 |
| 7,173,896 B2 * | 2/2007 | Arai et al. | 369/112.08 |
| 7,173,897 B2 * | 2/2007 | Arai et al. | 369/112.08 |

* cited by examiner

*Primary Examiner*—Wayne Young
*Assistant Examiner*—Adam R. Giesy
(74) *Attorney, Agent, or Firm*—Finnegan, Henderson, Farabow, Garrett & Dunner, L.L.P.

(57) ABSTRACT

An optical pickup device wherein at least a high density disc such as HD-DVD is compatible with DVD, and securing an amount of light is compatible with correction of chromatic aberration. An a correcting element representing an optical system used for the aforementioned optical pickup device.

39 Claims, 5 Drawing Sheets

OBJECTIVE CHROMATIC ABBERATION

OBJECTIVE CHROMATIC ABBERATION

OBJECTIVE CHROMATIC ABBERATION

OBJECTIVE CHROMATIC ABBERATION

OBJECTIVE CHROMATIC ABBERATION

OPTICAL PICKUP DEVICE AND CORRECTING ELEMENT USED IN THE OPTICAL PICKUP DEVICE

RELATED APPLICATION

This application is based on patent application No. 2003-374616 filed in Japan, the entire content of which is hereby incorporated by reference.

BACKGROUND

1. Field of the Invention

The present invention relates to an optical pickup device and to a correcting element used in the optical pickup device.

2. Description of the Related Art

In recent years, there have been made research and development on the so-called high density optical disc wherein recording density of an optical information recording medium (optical disc) has been enhanced by using a blue laser beam having a wavelength of about 400 nm, and thereby, a storage capacity has been increased.

As a standard of the high density optical disc, there are known, for example, the one wherein an image-side numerical aperture of an objective lens (NA) is about 0.85 and a protective substrate thickness is about 0.1 mm and the one wherein NA and a protective substrate thickness are controlled to be respectively about 0.65 and about 0.6 mm which are similar to those of a conventional DVD (digital versatile disc). In the following explanation, the high density optical disc whose NA and protective substrate thickness are respectively about 0.65 and about 0.6 mm will be indicated as "HD-DVD (High Density DVD)".

There are proposed various technologies relating to optical pickup devices each having compatibility between the high density optical disc of this kind and an optical disc which has been used widely such as DVD and CD (compact disc).

Incidentally, light flux wavelengths $\lambda 1$, $\lambda 2$ and $\lambda 3$ used respectively for HD-DVD, DVD and CD are respectively about 400 nm, about 650 nm and about 780 nm, and protective substrate thickness t1, t2 and t3 are respectively about 0.6 mm, about 0.6 mm and about 1.2 mm.

To achieve compatibility among the optical discs in plural types of this kind, it is necessary to correct aberrations each being generated by a difference between wavelengths or a difference between protective substrate thicknesses, while securing an amount of a light flux used for each optical disc, and Japanese laid-open patent No. 2001-60336, for example, discloses a technology to provide a diffractive structure on an optical surface of an optical element that constitutes an optical pickup device.

The invention disclosed in Japanese laid-open patent No. 2001-60336 is an optical pickup device having an compatibility between HD-DVD and DVD or an compatibility among HD-DVD, DVD and CD, wherein chromatic aberration of HD-DVD is corrected by combining a diffractive optical element and an objective lens.

However, in the high density optical disc such as HD-DVD, a tolerance of a value of chromatic aberration in a light-converging spot is narrower than that of DVD, and it is necessary to secure an amount of light sufficiently, thus, in the invention disclosed in Japanese laid-open patent No. 2001-60336, correction of chromatic aberration has not always been sufficient.

SUMMARY

In view of the problems stated above, an object of the invention is to provide an optical pickup device wherein at least a high density disc such as HD-DVD is compatible with DVD, and securing an amount of light is compatible with correction of chromatic aberration and to provide a correcting element representing an optical system used for the aforementioned optical pickup device.

The object of the invention mentioned above can be attained by the inventions shown as follows.

According to the first invention, an optical pickup device has therein a first light source emitting a light flux with wavelength $\lambda 1$ (380 nm$\leq \lambda 1 \leq$450 nm), a second light source emitting a light flux with wavelength $\lambda 2$ (600 nm$\leq \lambda 2 \leq$700 nm), a light-converging optical element having a diffractive structure through which the light flux with wavelength $\lambda 1$ and the light flux with wavelength $\lambda 2$ pass, a first correcting element having a diffractive structure through which at least the light flux with wavelength $\lambda 1$ passes, a second correcting element having a diffractive structure through which at least the light flux with wavelength $\lambda 2$ passes, and a beam splitter that makes an optical path for the light flux with wavelength $\lambda 1$ and that for the light flux with wavelength $\lambda 2$ to agree with each other in terms of their positions, wherein reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength $\lambda 1$ generated by diffractive effects of the light-converging optical element, in the case of using the optical pickup device and the second light-converging spot formed on the second optical information recording medium by n2$^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source, and an absolute value of chromatic aberration owned by the first correcting element itself is controlled to be 2.1 λm/nm or less for the light flux emitted from the first light source.

In the present specification, the "chromatic aberration" means the one wherein an amount of the position change for the minimum wavefront aberration in the optical axis direction for the light-converging spot on the optical information recording medium in the case of the change of a wavelength of light by +1 μm is indicated using the sign in which the direction to leave the light-converging optical element is positive.

The "chromatic aberration owned by the element itself" is in the case of evaluating on the individual element, and it means the one wherein an amount of fluctuation of the position for the minimum wavefront aberration in the optical axis direction for the light-converging spot in the case of the change of a wavelength of light by +1 μm is indicated using the sign in which the direction to leave the light-converging optical element is positive.

The "image-surface-side numerical aperture" means a numerical aperture (beam-diameter-converted NA) obtained by diameter of the light-converging spot formed on an information recording surface if the optical information recording medium.

According to the first invention, it is possible to control chromatic aberration of the first light-converging spot in the case of using an optical pickup device to be within a range that is necessary for reproducing and/or recording of information, by making chromatic aberration of the light-converging optical system itself for the first light flux emitted from the first light source and chromatic aberration of the first correcting element itself to be nearly zero.

According to the second invention, an optical pickup device has therein a first light source emitting a light flux with wavelength $\lambda 1$ (380 nm$\leq \lambda 1 \leq$450 nm), a second light source emitting a light flux with wavelength $\lambda 2$ (600 nm$\leq \lambda 2 \leq$700 nm), a light-converging optical element having a diffractive structure through which the light flux with wavelength $\lambda 1$ and the light flux with wavelength $\lambda 2$ pass, a first correcting element having a diffractive structure through which at least the light flux with wavelength $\lambda 1$ passes, a second correcting element through which at least the light flux with wavelength $\lambda 2$ passes, and a beam splitter that makes an optical path for the light flux with wavelength $\lambda 1$ and that for the light flux with wavelength $\lambda 2$ to agree with each other-in terms of their positions, reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength $\lambda 1$ generated by diffractive effects of the light-converging optical element, in the case of using the optical pickup device and the second light-converging spot formed on the second optical information recording medium by n2$^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, an absolute value of chromatic aberration owned by the light-converging optical element itself is controlled to be 0.25 μm/nm or less for the light flux emitted from the second light source.

Compared with HD-DVD, a demand for correction of chromatic aberration in DVD is lower, and therefore, no diffractive structure is provided on second correcting element L2 as in the second invention, and it is possible to control chromatic aberration of the second light-converging spot to be within a range necessary for reproducing and/or recording of information, even in the case of the structure in which the second correcting element itself has chromatic aberration for the second light flux. In this case, a large amount of light can be secured because for the second light flux it is not case that an amount of light is lost in passing through diffractive ring-shaped zones.

It is further possible that the second correcting element is provided with a diffractive structure, and that an absolute value of chromatic aberration owned by the second correcting element itself is controlled to be 3.5 μm/nm or less for the light flux emitted from the second light source. In this way, worse of wavefront aberration can be suppressed, even when wavelength change are caused in the case of tracking in reproducing and/or recording for DVD, by controlling chromatic aberration of the light-converging optical element for the second light flux and that of the second correcting element itself to be nearly zero.

According to the third invention, an optical pickup device has therein a first light source emitting a light flux with wavelength $\lambda 1$ (380 nm$\leq \lambda 1 \leq$450 nm), a second light source emitting a light flux with wavelength $\lambda 2$ (600 nm$\leq \lambda 2 \leq$700 nm), a light-converging optical element having a diffractive structure through which the light flux with wavelength $\lambda 1$ and the light flux with wavelength $\lambda 2$ pass, a first correcting element having a diffractive structure through which at least the light flux with wavelength $\lambda 1$ passes, a second correcting element through which at least the light flux with wavelength $\lambda 2$ passes, and a beam splitter that makes an optical path for the light flux with wavelength $\lambda 1$ and that for the light flux with wavelength $\lambda 2$ to agree with each other in terms of their positions, wherein reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by n1$^{th}$ diffracted light (n1 is a-natural number) of the light flux with wavelength $\lambda 1$ generated by diffractive effects of the light-converging optical element, in the case of using the optical pickup device and the second light-converging spot formed on the second optical information recording medium by n2$^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source and a sign for a value of chromatic aberration owned by the light-converging optical element for the light flux emitted from the second light source are the same.

Further, it is possible to make a chromatic aberration owned by the light-converging optical element itself for the light flux emitted from the first light source and a value of chromatic aberration owned by the light-converging optical element itself for the light flux emitted from the second light source to be positive. By doing this, effects of the diffractive structure formed on the light-converging optical element can be weakened. It is therefore possible to attain an improvement of processability by widening diffraction pitches and to reduce a loss of light.

Further, a value of chromatic aberration owned by the second correcting element itself for the light flux emitted from the second light flux may also be made to be negative.

Further, a value of chromatic aberration owned by the light-converging optical element itself for the light flux emitted from the first light source and a value of chromatic aberration owned by the light-converging optical element itself for the light flux emitted from the second light source may also be made to be negative.

Further, a value of chromatic aberration owned by the second correcting element itself for the light flux emitted from the second light source may also be made to be positive.

It is also possible to provide a diffractive structure on the second correcting element.

According to the fourth invention, an optical pickup device has therein a first light source emitting a light flux with wavelength $\lambda 1$ (380 nm$\leq\lambda 1\leq$450 nm), a second light source emitting a light flux with wavelength $\lambda 2$ (600 nm$\leq\lambda 2\leq$700 nm), a light-converging optical element having a diffractive structure through which the light flux with wavelength $\lambda 1$ and the light flux with wavelength $\lambda 2$ pass, a first correcting element through which at least the light flux with wavelength $\lambda 1$ passes, a second correcting element having a diffractive structure through which at least the light flux with wavelength $\lambda 2$ passes, and a beam splitter that makes an optical path for the light flux with wavelength $\lambda 1$ and that for the light flux with wavelength $\lambda 2$ to agree with each other in terms of their positions, wherein reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element, in the case of using the optical pickup device and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source is different from a sign for a value of chromatic aberration owned by the light-converging optical element for the light flux emitted from the second light source.

Further, a value of chromatic aberration owned by the second correcting element itself for the light flux emitted from the second light flux may also be made to be negative.

The first correcting element may also be provided with a diffractive structure.

In each of the first-fourth inventions, the light-converging optical element may also be made of plastic.

The first correcting element may also be made of plastic.

The second correcting element may also be made of plastic.

Focal length f of the light-converging optical element for the light flux with wavelength $\lambda 1$ may also be made to satisfy 1 mm$\leq$f$\leq$4 mm.

Focal length f1 of the first correcting element for the light flux with wavelength $\lambda 1$ may also be made to satisfy 5.5 mm$\leq$f1$\leq$32 mm.

Focal length f2 of the second correcting element for the light flux with wavelength $\lambda 2$ may also be made to satisfy 5.5 mm$\leq$f12$\leq$32 mm.

Magnification m1 of the optical system including the first light source up to the first optical information recording medium for the light flux with wavelength $\lambda 1$ may also be made to satisfy $-1/3\leq$m1$\leq-1/10$.

Further, magnification m2 of the optical system including the second light source up to the second optical information recording medium may also be made to satisfy $-1/3\leq$m2$\leq-1/10$.

Further, image-surface-side numerical aperture NA1 of the light-converging optical element for the light flux with wavelength $\lambda 1$ in the case of using the optical pickup device may also be made to satisfy 0.63$\leq$NA1$\leq$0.67.

Further, image-surface-side numerical aperture NA2 of the light-converging optical element for the light flux with wavelength $\lambda 2$ in the case of using the optical pickup device may also be made to satisfy 0.59$\leq$NA2$\leq$0.67.

At least one of the first correcting element and the second correcting element may also be made to be a collimator.

A combination of the n1 and n2 may also be made to be any one of (n1, n2)=(0, 1), (2, 1), (3, 2), (5, 3) and (8, 5).

It is also possible to arrange to provide a third light source emitting a light flux with wavelength $\lambda 3$ (750 nm$\leq\lambda 3\leq$800 nm) and to conduct reproducing and/or recording of information for a third optical information recording medium having protective substrate thickness t3 (1.1 mm$\leq$t3$\leq$1.3 mm) by using $n3^{th}$ (n3 is a natural number) diffracted light of the light flux with wavelength $\lambda 3$ generated by diffractive effects of the light-converging optical element in the case of using the optical pickup device.

Magnification m3 of the optical system including the third light source up to the third optical information recording medium for the light flux with wavelength $\lambda 3$ may also be made to satisfy $-1/4\leq$m3$\leq-1/10$.

A combination of the n1, n2 and n3 may also be made to be any one of (n1, n2, n3)=(0, 1, 0), (2, 1, 1), (3, 2, 2), (5, 3, 3) and (8, 5, 4).

It is also possible to arrange so that the light flux with wavelength $\lambda 3$ may pass through the second correcting element.

The second light source and the third light source may also constitute a packaged light source.

When a diffractive structure is provided on the second correcting element, the diffractive structure may also be provided on a plane of incidence and on a plane of emergence of the second correcting element.

It is also possible to arrange the chromatic aberration of the first light-converging spot and the chromatic aberration of the second light-converging spot to be controlled within a range necessary for reproducing and/or recording of information, by controlling an absolute value of the chromatic aberration of the first light-converging spot to be 0.15 μm/nm or less and by controlling an absolute value of the chromatic aberration of the second light-converging spot to be 0.25 μm/nm or less.

According to the fifth invention, a correcting element used for an optical pickup device is a first correcting element used in a pickup device, the pickup device having a first light source emitting a light flux with wavelength $\lambda 1$ (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element having a diffractive structure through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element, in the case of using the optical pickup device and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source and is controlled to be 0.25 μm/nm or less for the light flux emitted from the second light source, and an absolute value of chromatic aberration owned by the first correcting element itself is controlled to be 2.1 μm/nm or less for the light flux emitted from the first light source.

According to the sixth invention, a correcting element used for an optical pickup device is a first correcting element used in a pickup device, the pickup device having a first light source emitting a light flux with wavelength λ1 (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element having a diffractive structure through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element, in the case of using the optical pickup device and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and an absolute value of chromatic aberration owned by the light-converging optical element itself is controlled to be 0.15 μm/nm or less for the light flux emitted from the first light source and is controlled to be 0.25 μm/nm or less for the light flux emitted from the second light source.

It is also possible to arrange to provide a diffractive structure on the second correcting element and to control an absolute value of chromatic aberration owned by the second correcting element itself to be 3.5 μm/nm or less for the light flux emitted from the second light source.

According to the seventh invention, a correcting element used for an optical pickup device is a first correcting element used in a pickup device, the pickup device having a first light source emitting a light flux with wavelength λ1 (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element, in the case of using the optical pickup device and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source is the same as that for a value of chromatic aberration owned by the light-converging optical element for the light flux emitted from the second light source.

Values of chromatic aberrations owned by the light-converging optical element itself respectively for the light flux emitted from the first light source and the light flux emitted from the second light source may be positive.

Further, a value of chromatic aberration owned by the second correcting element itself for the light flux emitted from the second light source may also be negative.

Values of chromatic aberrations owned by the light-converging optical element itself respectively for the light flux emitted from the first light source and the light flux emitted from the second light source may be negative.

Further, a value of chromatic aberration owned by the second correcting element itself for the light flux emitted from the second light source may also be positive.

It is also possible to provide a diffractive structure on the second correcting element.

According to the eighth invention, a correcting element used for an optical pickup device is a first correcting element used in a pickup device, the pickup device having a first light source emitting a light flux with wavelength $\lambda 1$ (380 nm$\leq\lambda 1\leq$450 nm), a second light source emitting a light flux with-wavelength $\lambda 2$ (600 nm$\leq\lambda 2\leq$700 nm), a light-converging optical element having a diffractive structure through which the light flux with wavelength $\lambda 1$ and the light flux with wavelength $\lambda 2$ pass, a first correcting element having a diffractive structure through which at least the light flux with wavelength $\lambda 1$ passes, a second correcting element having a diffractive structure through which at least the light flux with wavelength $\lambda 2$ passes, and a beam splitter that makes an optical path for the light flux with wavelength $\lambda 1$ and that for the light flux with wavelength $\lambda 2$ to agree with each other in terms of their positions, reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element, in the case of using the optical pickup device and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source is different from that for a value of chromatic aberration owned by the light-converging optical element for the light flux emitted from the second light source.

Further, a value of chromatic aberration owned by the second correcting element itself for the light flux emitted from the second light flux may also be made to be negative.

The first correcting element may also be provided with a diffractive structure.

In each of the fifth-eighth inventions, the light-converging optical element may also be made of plastic.

The first correcting element may also be made of plastic.

The second correcting element may also be made of plastic.

Focal length f of the light-converging optical element for the light flux with wavelength $\lambda 1$ may also be made to satisfy 1 mm$\leq$f$\leq$4 mm.

Focal length f1 for the light flux with wavelength $\lambda 1$ may also be made to satisfy 5.5 mm$\leq$f1$\leq$32 mm.

Focal length f2 of the second correcting element for the light flux with wavelength $\lambda 2$ may also be made to satisfy 5.5 mm$\leq$f12$\leq$32 mm.

Magnification m1 of the optical system including the first light source up to the first optical information recording medium for the light flux with wavelength $\lambda 1$ may also be made to satisfy $-\frac{1}{3}\leq$m1$\leq-\frac{1}{10}$.

Further, magnification m2 of the optical system including the second light source up to the second optical information recording medium may also be made to satisfy $-\frac{1}{3}\leq$m2$\leq-\frac{1}{10}$.

Further, image-surface-side numerical aperture NA1 of the light-converging optical element for the light flux with wavelength $\lambda 1$ in the case of using the optical pickup device may also be made to satisfy 0.63$\leq$NA1$\leq$0.67.

Further, image-surface-side numerical aperture NA2 of the light-converging optical element for the light flux with wavelength $\lambda 2$ in the case of using the optical pickup device may also be made to satisfy 0.59$\leq$NA2$\leq$0.67.

At least one of the first correcting element and the second correcting element may also be made to be a collimator.

A combination of the n1 and n2 may also be made to be any one of (n1, n2)=(0, 1), (2, 1), (3, 2), (5, 3) and (8, 5).

It is also possible to arrange so that the optical pickup device is provided with a third light source emitting a light flux with wavelength $\lambda 3$ (750 nm$\leq\lambda 3\leq$800 nm), and a third light-converging spot formed on the third optical information recording medium having protective substrate thickness t3 (1.1 mm$\leq$t3$\leq$1.3 mm) by the $n3^{th}$ diffracted light (n3 is a natural number) of the light flux with wavelength $\lambda 3$ generated by the diffractive effects of the light-converging optical element in the case of using the optical pickup device is controlled, in terms of chromatic aberration, to be within a range necessary for reproducing and/or recording of information.

Magnification m3 of the optical system including the third light source up to the third optical information recording medium for the light flux with wavelength $\lambda 3$ may also be made to satisfy $-\frac{1}{4}\leq$m3$\leq-\frac{1}{10}$.

A combination of the n1, n2 and n3 may also be made to be any one of (n1, n2, n3)=(0, 1, 0), (2, 1, 1), (3, 2, 2), (5, 3, 3) and (8, 5, 4).

It is also possible to arrange so that the light flux with wavelength $\lambda 3$ may pass through the second correcting element.

The second light source and the third light source may also constitute a packaged light source.

When a diffractive structure is provided on the second correcting element, the diffractive structure may also be provided on a plane of incidence and on a plane of emergence of the second correcting element.

By controlling an absolute value of the chromatic aberration of the first light-converging spot to be 0.15 μm/nm or less and by controlling an absolute value of the chromatic aberration of the second light-converging spot to be 0.25

μm/nm or less, these chromatic aberrations may also be made to be controlled within a range necessary for reproducing and/or recording of information.

According to the ninth invention, a correcting element used for an optical pickup device is a second correcting element used in a pickup device, the pickup device having a first light source emitting a light flux with wavelength λ1 (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element having a diffractive structure through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength λ1 generated by diffractive effects of the light-converging optical element, in the case of using the optical pickup device and the second light-converging spot formed on the second optical information recording medium by $n2^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source and is controlled to be 0.25 μm/nm or less for the light flux emitted from the second light source and an absolute value of chromatic aberration owned by the first correcting element itself s controlled to be 2.1 μm/nm or less for the light flux emitted from the first light source.

According to the tenth invention, a correcting element used for an optical pickup device is a second correcting element used in a pickup device, the pickup device having a first light source emitting a light flux with wavelength λ1 (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength λ1 generated by diffractive effects of the light-converging optical element, in the case of using the optical pickup device and the second light-converging spot formed on the second optical information recording medium by $n2^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and an absolute value of chromatic aberration owned by the light-converging optical element itself is controlled to be 0.15 μm/nm or less for the light flux emitted from the first light source and is controlled to be 0.25 μm/nm or less for the light flux emitted from the second light source.

It is further possible to arrange so that a diffractive structure is provided on the second correcting element, and an absolute value of chromatic aberration owned by the second correcting element is corrected to be 3.5 μm/nm or less for the light flux emitted from the second light source.

According to the eleventh invention, a correcting element used for an optical pickup device is a second correcting element used in a pickup device, the pickup device having a first light source emitting a light flux with wavelength λ1 (380 nm≦λ1≦450 nm), a second light source emitting a light flux with wavelength λ2 (600 nm≦λ2≦700 nm), a light-converging optical element having a diffractive structure through which the light flux with wavelength λ1 and the light flux with wavelength λ2 pass, a first correcting element having a diffractive structure through which at least the light flux with wavelength λ1 passes, a second correcting element having a diffractive structure through which at least the light flux with wavelength λ2 passes, and a beam splitter that makes an optical path for the light flux with wavelength λ1 and that for the light flux with wavelength λ2 to agree with each other in terms of their positions, reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength λ1 generated by diffractive effects of the light-converging optical element, in the case of using the optical pickup device and the second light-converging spot formed on the second optical information recording medium by $n2^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source is the same as that for a value of chromatic aberration owned by the light-converging optical element for the light flux emitted from the second light source.

Values of chromatic aberrations owned by the light-converging optical element itself respectively for the light flux emitted from the first light source and the light flux emitted from the second light source may be positive.

Further, a value of chromatic aberration owned by the second correcting element itself for the light flux emitted from the second light source may also be negative.

Values of chromatic aberrations owned by the light-converging optical element itself respectively for the light flux emitted from the first light source and the light flux emitted from the second light source may be negative.

Further, a value of chromatic aberration owned by the second correcting element itself for the light flux emitted from the second light source may also be positive.

It is also possible to provide a diffractive structure on the second correcting element.

According to the eighth invention, a correcting element used for an optical pickup device is a first correcting element used in a pickup device, the pickup device having a first light source emitting a light flux with wavelength $\lambda 1$ (380 nm$\leq\lambda 1\leq$450 nm), a second light source emitting a light flux with wavelength $\lambda 2$ (600 nm$\leq\lambda 2\leq$700 nm), a light-converging optical element having a diffractive structure through which the light flux with wavelength $\lambda 1$ and the light flux with wavelength $\lambda 2$ pass, a first correcting element having a diffractive structure through which at least the light flux with wavelength $\lambda 1$ passes, a second correcting element having a diffractive structure through which at least the light flux with wavelength $\lambda 2$ passes, and a beam splitter that makes an optical path for the light flux with wavelength $\lambda 1$ and that for the light flux with wavelength $\lambda 2$ to agree with each other in terms of their positions, reproducing and/or recording of information is conducted on the first optical information recording medium having protective substrate thickness t1 (0 mm<t1$\leq$0.7 mm), by the use of the light flux with wavelength $\lambda 1$, reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element, in the case of using the optical pickup device and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, and, a sign for a value of chromatic aberration owned by the light-converging optical element for the light flux emitted from the first light source is different from that for a value of chromatic aberration owned by the light-converging optical element for the light flux emitted from the second light source.

Further, a value of chromatic aberration owned by the second correcting element itself for the light flux emitted from the second light flux may also be made to be negative.

The first correcting element may also be provided with a diffractive structure.

In each of the ninth-twelfth inventions, the light-converging optical element may also be made of plastic.

The first correcting element may also be made of plastic.

The second correcting element may also be made of plastic.

Focal length f of the light-converging optical element for the light flux with wavelength $\lambda 1$ may also be made to satisfy 1 mm$\leq$f$\leq$4 mm.

Focal length f1 of the first correcting element for the light flux with wavelength $\lambda 1$ may also be made to satisfy 5.5 mm$\leq$f1$\leq$32 mm.

Focal length f2 of the second correcting element for the light flux with wavelength $\lambda 2$ may also be made to satisfy 5.5 mm$\leq$f12$\leq$32 mm.

Magnification m1 of the optical system including the first light source up to the first optical information recording medium for the light flux with wavelength $\lambda 1$ may also be made to satisfy $-\frac{1}{3}\leq$m1$\leq-\frac{1}{10}$.

Further, magnification m2 of the optical system including the second light source up to the second optical information recording medium may also be made to satisfy $-\frac{1}{3}\leq$m2$\leq-\frac{1}{10}$.

Further, image-surface-side numerical aperture NA1 of the light-converging optical element for the light flux with wavelength $\lambda 1$ in the case of using the optical pickup device may also be made to satisfy 0.63$\leq$NA1$\leq$0.67.

Further, image-surface-side numerical aperture NA2 of the light-converging optical element for the light flux with wavelength $\lambda 2$ in the case of using the optical pickup device may also be made to satisfy 0.59$\leq$NA2$\leq$0.67.

At least one of the first correcting element and the second correcting element may also be made to be a collimator.

A combination of the n1 and n2 may also be made to be any one of (n1, n2)=(0, 1), (2, 1), (3, 2), (5, 3) and (8, 5).

It is also possible to arrange so that the optical pickup device is provided with a third light source emitting a light flux with wavelength $\lambda 3$ (750 nm$\leq\lambda 3\leq$800 nm), and a third light-converging spot formed on the third optical information recording medium having protective substrate thickness t3 (1.1 mm$\leq$t3$\leq$1.3 mm) by the $n3^{th}$ diffracted light (n3 is a natural number) of the light flux with wavelength $\lambda 3$ generated by the diffractive effects of the light-converging optical element in the case of using the optical pickup device is controlled, in terms of chromatic aberration, to be within a range necessary for reproducing and/or recording of information.

Magnification m3 of the optical system including the third light source up to the third optical information recording medium for the light flux with wavelength $\lambda 3$ may also be made to satisfy $-\frac{1}{4}\leq$m3$\leq-\frac{1}{10}$.

A combination of the n1, n2 and n3 may also be made to be any one of (n1, n2, n3)=(0, 1, 0), (2, 1, 1), (3, 2, 2), (5, 3, 3) and (8, 5, 4).

It is also possible to arrange so that the light flux with wavelength $\lambda 3$ may pass through the second correcting element.

The second light source and the third light source may also constitute a packaged light source.

When a diffractive structure is provided on the second correcting element, the diffractive structure may also be provided on a plane of incidence and on a plane of emergence of the second correcting element.

By controlling an absolute value of the chromatic aberration of the first light-converging spot to be 0.15 μm/nm or less and by controlling an absolute value of the chromatic aberration of the second light-converging spot to be 0.25 μm/nm or less, these chromatic aberrations may also be made to be controlled within a range necessary for reproducing and/or recording of information.

The invention makes it possible to obtain an optical pickup device wherein at least HD-DVD is compatible with DVD, and securing an amount of light is compatible with correction of chromatic aberration, and to obtain a correcting element (first correcting element and second correcting element) representing an optical system used for the aforementioned optical pickup device.

The invention itself, together with further objects and attendant advantages, will best be understood by reference to the following detailed description taken in conjunction with the accompanying drawings.

Each of FIGS. 3(a)-3(e) shows chromatic aberration of a light-converging optical element.

Figure 4:
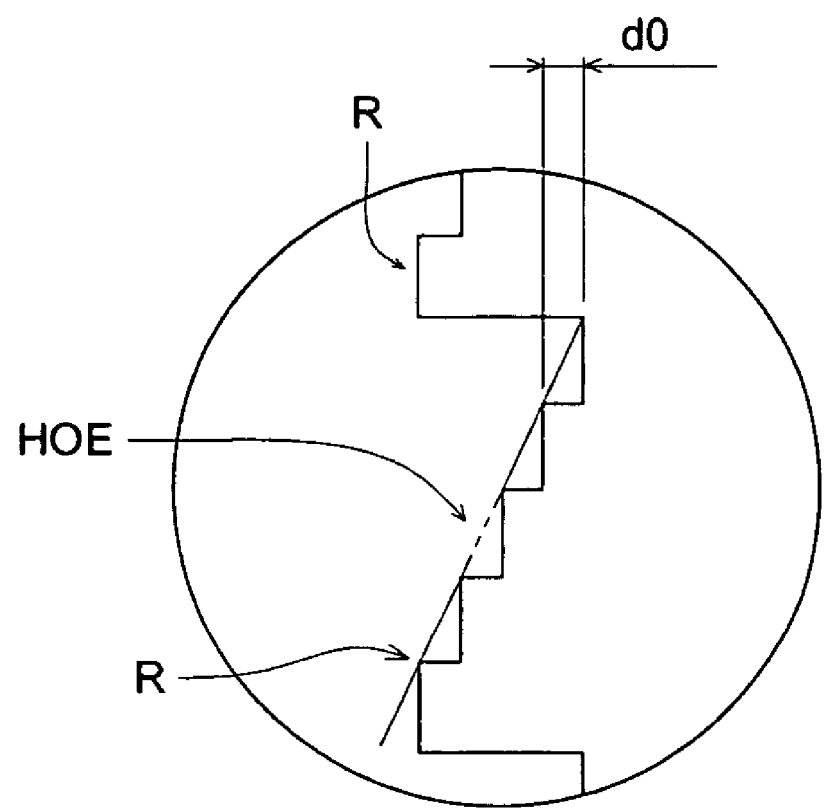

FIG. 4 is a plan view of primary portions showing the structure of a light-converging optical system.

Figure 5:
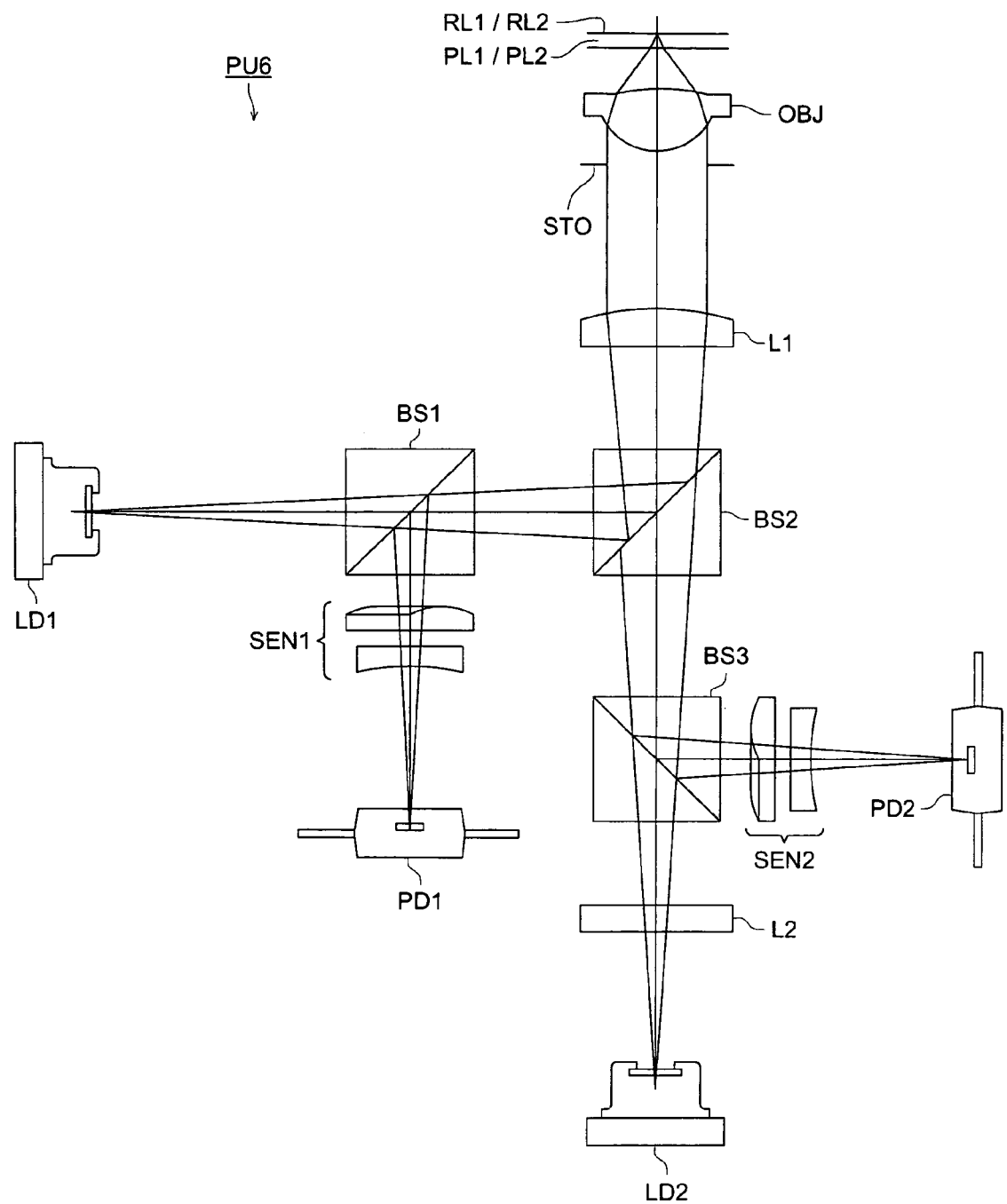

FIG. 5 is a plan view of primary portions showing the structure of an optical pickup device relating to the invention.

In the following description, like parts are designated by like reference numbers throughout the several drawing.

DESCRIPTION OF THE PREFERRED EMBODIMENT

The preferred embodiment to practice the invention will be explained in detail as follows, referring to the drawings.

First Embodiment

Figure 1:
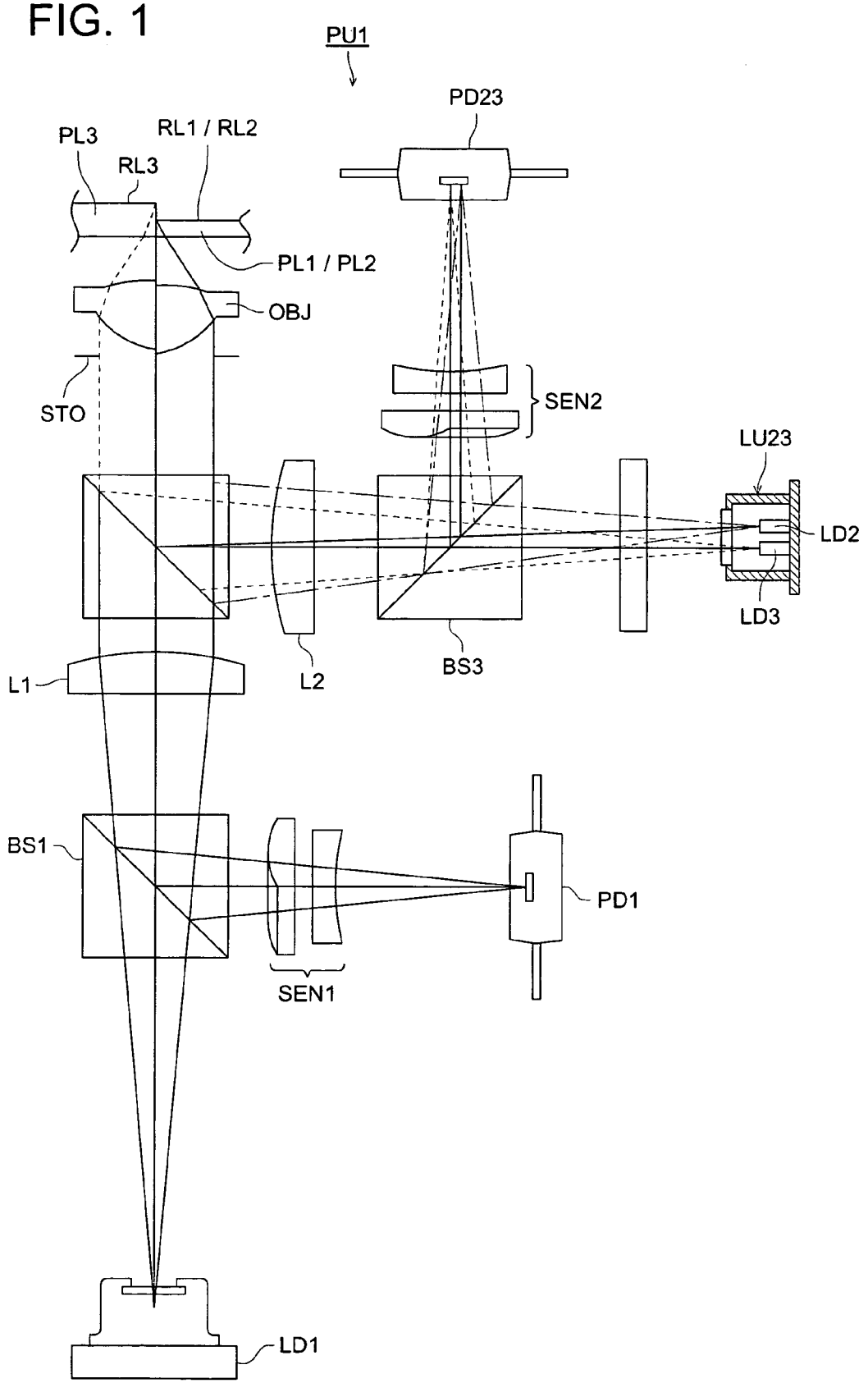
FIG. 1 is a plan view of primary portions showing the structure of an optical pickup device relating to the invention.

FIG. 1 is a drawing showing schematically the structure of first pickup device PU1 capable of conducting recording/reproducing of information properly for any one of HD-DVD (first optical information recording medium), DVD (second optical information recording medium) and CD (third optical information recording medium). In the optical specifications of HD-DVD, wavelength $\lambda 1$ is 407 nm, thickness t1 of protective layer PL1 is 0.6 mm and numerical aperture NA1 is 0.65, in the optical specifications of DVD, wavelength $\lambda 2$ is 655 nm, thickness t2 of protective layer PL2 is 0.6 mm and numerical aperture NA2 is 0.65, and in the optical specifications of CD, wavelength $\lambda 3$ is 785 nm, thickness t3 of protective layer PL3 is 1.2 mm and numerical aperture NA3 is 0.51. However, a combination of a wavelength, a thickness of the protective layer and a numerical aperture is not limited to the foregoing.

Optical pickup device PU1 is composed of light source unit LU 23 wherein there are united solidly violet semiconductor laser LD1 (first light source) that emits a laser light flux (first light flux) with wavelength 407 nm when conducting recording/reproducing of information for HD-DVD, red semiconductor laser LD2 (second light source) that emits a laser light flux (second light flux) with wavelength 655 nm when conducting recording/reproducing of information for photodetector PD1 for the first light flux and DVD, and infrared semiconductor laser LD3 (third light source) that emits a laser light flux (third light flux) with wavelength 785 nm when conducting recording/reproducing of information for CD, photodetector PD 23 that is common for both the second light flux and the third light flux, first correcting element L1 through which only the first light flux passes, second correcting element L2 through which the second and third light fluxes pass, objective lens (light-converging optical element) OBJ having a function to converge each laser light flux on each of information recording surfaces RL1, RL2 and RL3, first beam splitter BS1, second beam splitter BS2, third beam splitter BS3, diaphragm STO and sensor lenses SEN1 and SEN2.

Incidentally, a diffractive structure is provided on each of the first correcting element L1, the second correcting element L2 and objective lens OBJ, for which the detailed explanation will be given later.

When conducting recording/reproducing of information for HD-DVD in optical pickup device PU1, violet semiconductor laser LD1 is first driven to emit light as shown in FIG. 1 where a light path is indicated with solid lines. A divergent light flux emitted from the violet semiconductor laser LD1 passes through the first beam splitter BS1, then, is transmitted through the first correcting element L1 to be converted into a collimated light flux, and passes through the second beam splitter BS2 to arrive at light-converging optical element OBJ.

Then, $n1^{th}$ diffracted light (n1 is a natural number) of the first light flux generated by diffractive effects of the diffractive structure of the light-converging optical element OBJ is converged on information recording surface RL1 through protective layer PL1 of HD-DVD to form a spot (first light-converging spot). This first light-converging spot is controlled to be within a range necessary for reproducing and/or recording of information in terms of chromatic aberration, and an absolute value of chromatic aberration for the first light-converging spot is controlled specifically to be 0.15 μm/nm or less.

Then, the light-converging optical element OBJ conducts focusing and tracking with biaxial actuator AC (not shown) that is arranged on the periphery of the light-converging optical element OBJ. A reflected light flux modulated by information pits on information recording surface RL1 passes again through the light-converging optical element OBJ, the second beam splitter BS2 and the first correcting element L1, to be branched by the first beam splitter BS1, and is given astigmatism by sensor lens SEN 1 to be converged on a light-receiving surface of photodetector PD 1. Thus, information recorded on HD-DVD by the use of output signals of the photodetector PD 1 can be read.

Further, when conducting recording/reproducing of information for DVD, the red semiconductor laser LD2 is first driven to emit light as shown in FIG. 1 where a light path is indicated with one-dot chain lines. A divergent light flux emitted from the red semiconductor laser LD2 passes through the third beam splitter BS3, then, is transmitted through the second correcting element L2 to be converted into a collimated light flux, and is reflected on the second beam splitter BS2 to arrive at light-converging optical element OBJ.

Then, $n2^{th}$ diffracted light (n2 is a natural number satisfying n1≠n2) of the second light flux generated by diffractive effects of the diffractive structure of light-converging optical element OBJ is converged on information recording surface RL2 through protective layer PL2 of DVD to form a spot (second light-converging spot). This second light-converging spot is controlled, in terms of chromatic aberration, to be within a range necessary for reproducing and/or recording of information, and an absolute value of chromatic aberration of the second light-converging spot is specifically controlled to be 0.25 μm/nm or less.

Then, the light-converging optical element OBJ conducts focusing and tracking with biaxial actuator AC that is arranged on the periphery of the light-converging optical element OBJ. A reflected light flux modulated by information pits on information recording surface RL2 passes again through the light-converging optical element OBJ, the second beam splitter BS2 and the second correcting element L2, to be branched by the third beam splitter BS3, and is converged on the light-receiving surface of photodetector PD 23. Thus, information recorded on DVD by the use of output signals of photodetector 23 can be read.

Further, when conducting recording/reproducing of information for CD, the infrared semiconductor laser LD3 is first driven to emit light as shown in FIG. 1 where a light path is indicated with dotted lines. A divergent light flux emitted from the infrared semiconductor laser LD3 passes through the third beam splitter BS3, then, it emerges from the second correcting element L2, and is reflected on the second beam splitter BS2 to arrive at light-converging optical element OBJ.

Then, n3$^{th}$ diffracted light (n3 is a natural number) of the third light flux generated by diffractive effects of the diffractive structure of light-converging optical element OBJ is converged on information recording surface RL3 through protective layer PL3 of CD to form a spot (third light-converging spot). This third light-converging spot is controlled, in terms of chromatic aberration, to be within a range necessary for reproducing and/or recording of information.

Then, the light-converging optical element OBJ conducts focusing and tracking with biaxial actuator AC that is arranged on the periphery of the light-converging optical element OBJ. A reflected light flux modulated by information pits on information recording surface RL3 passes again through the light-converging optical element OBJ, the second beam splitter BS2 and the second correcting element L2, to be branched by the third beam splitter BS3, and is converged on the light-receiving surface of photodetector PD 23. Thus, information recorded on CD by the use of output signals of photodetector 23 can be read.

The light-converging optical element OBJ is a plastic single lens with aspheric surfaces on both sides having a function to make the first-third light fluxes to be converged respectively on information recording surfaces RL1-RL3. Incidentally, the light-converging optical element may also be constructed by combining a plurality of optical elements.

Figure 2:
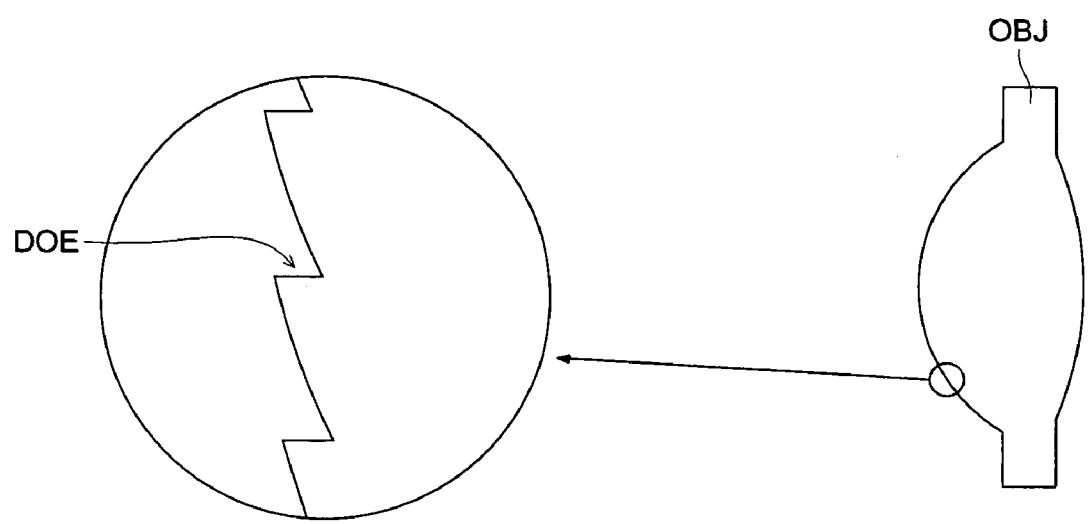
FIG. 2 is a plan view of primary portions showing the structure of a light-converging optical system.

On a plane of incidence of the light-converging optical element OBJ, there is formed blaze-formed diffractive structure DOE shown in FIG. 2. The blaze-formed diffractive structure DOE is provided for the purpose of correcting chromatic aberration that is owned by light-converging optical element OBJ itself for the light flux emitted from the first light source, and it is designed specifically so that an absolute value of the chromatic aberration may be 0.15 μm/nm or less.

First correcting element L1 has a collimating function to convert the first light flux emitted from the first light source LD1 as a divergent light into a collimated light, and on its plane of emergence, there is formed blaze-formed diffractive structure DOE that is the same as one shown in FIG. 2. The blaze-formed diffractive structure DOE is provided for the purpose of correcting chromatic aberration that is owned by the first correcting element L1 itself for the light flux emitted from the first light source, and it is designed specifically so that an absolute value of the chromatic aberration may be 2.1 μm/nm or less.

First correcting element L2 has a collimating function to convert the second light flux emitted from the second light source LD2, and has a function to change a divergent angle of the third light flux emitted from the third light source LD3 as a divergent light to be a smaller divergent angle, and on each of its plane of incidence and plane of emergence, there is formed blaze-formed diffractive structure DOE that is the same as one shown in FIG. 2.

Figure 3:
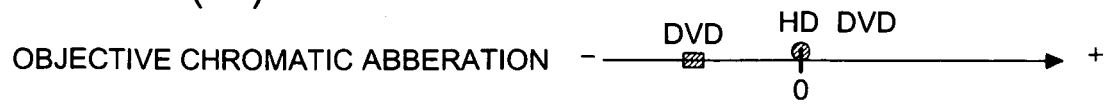
Figure 3:
Figure 3:
Figure 3:
Figure 3:

FIG. 3(a) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

FIG. 3(a) shows that an absolute value of chromatic aberration owned by the light-converging optical element itself for the first light flux is made to be 0.15 μm/nm or less, namely, to be zero substantially, by the blaze-formed diffractive structure DOE formed on the light-converging optical element, as stated above.

Although an illustration is omitted, an absolute value of the chromatic aberration owned by the first correcting element itself for the first light flux is also made to be 2.1 μm/nm or less, namely, to be zero substantially, by the blaze-formed diffractive structure DOE formed on the first correcting element.

As stated above, by making chromatic aberration of the light-converging optical element itself for the first light source and chromatic aberration of the first correcting element itself to be substantially zero respectively, it is possible to control chromatic aberration of the first light-converging spot in the case of using an optical pickup device to be within a range that is necessary for reproducing and/or recording of information.

If the blaze-formed diffractive structure DOE of the light-converging optical element is designed so that the chromatic aberration of the light-converging optical element itself for the first light flux may be substantially zero, the chromatic aberration of the light-converging optical element for the second light flux remains and a value of the chromatic aberration becomes negative specifically, as shown in FIG. 3(a).

In the present embodiment, therefore, the blaze-formed diffractive structure DOE on each of the plane of incidence and the plane of emergence of the second correcting element is designed so that a value of chromatic aberration owned by the second correcting element itself for the second light flux may be positive, although an illustration thereof is omitted.

As stated above, by making negative chromatic aberration of the light-converging optical element itself for the second light flux to be cancelled by positive chromatic aberration of the second correcting element itself, it is possible to control chromatic aberration of the second light-converging spot in the case of using an optical pickup device to be within a range that is necessary for reproducing and/or recording of information.

Incidentally, since the design technology to change properly the value of chromatic aberration owned by the optical element itself for the specific light flux by the use of a diffractive structure formed on the optical element is known widely, an explanation thereof will be omitted here.

Further, a diffractive structure formed on each of light-converging optical element OBJ, first correcting element L1 and second correcting element L2 may also be superimposed-type diffractive structure HOE representing a structure wherein there are arranged plural ring-shaped zones R in each of which a staircase structure is formed as shown in FIG. 4 in a way that their centers are on the optical axis.

In the structure and the design method for ordinary superimposed-type diffractive structure HOE, depth of one step d0 in the staircase structure formed in each ring-shaped zone R is set to a value calculated by an expression of $d0=k\times\lambda 1/(n1-1)$ μm, and number of division N for respective ring-shaped zones R is set to 5. In the expression above, $\lambda 1$ represents a wavelength that is of a laser light flux emitted from a violet semiconductor laser and is expressed with a unit of micron ($\lambda 1=0.408$ μm, in this case), and n1 is a refractive index of aberration correcting element L1 for wavelength $\lambda 1$ (n1=1.5242, in this case).

When laser light flux with wavelength $\lambda 1$ enters the superimposed-type diffractive structure HOE, there is generated an optical path difference of $k\times\lambda 1$ μm between adjoining steps of the staircase, and a laser light flux with wavelength $\lambda 1$ is not diffracted and is transmitted as it is, because no phase difference is given to the laser light flux. Incidentally, in the following explanation, a light flux that is transmitted as it is without being given a phase difference substantially by superimposed-type diffractive structure is called a zero-order diffracted light.

In the case of k=2, for example, when a laser light flux with wavelength $\lambda 2$ ($\lambda 2=0.658$ μm, in this case) emitted from a red semiconductor laser enters the superimposed-type diffractive structure HOE, there is generated an optical path difference of $d0\times(n2-1)-\lambda 2=0.13$ μm between adjoining staircases, and wavefronts transmitted through adjoining ring-shaped zones R are superposed while being staggered by one wavelength, because there is generated an optical path difference equivalent to a difference between $0.13\times 5=0.65$ μm and one wavelength of wavelength $\lambda 2$, for single ring-shaped zone R equivalent to one fifth of ring-shaped zones R. Namely, a light flux with wavelength $\lambda 2$ is made to be a diffracted light diffracted in the first-order direction by the superimposed-type diffractive structure HOE. Incidentally, n2 represents a refractive index of aberration correcting element L2 for wavelength $\lambda 2$ (n2=1.5064, in this case). The diffraction efficiency of the first-order diffracted light for the laser light flux with wavelength $\lambda 2$ in this case is 87.5% which is a sufficient amount of light for recording/reproducing of information for DVD.

When superimposed-type diffractive structure HOE is formed on light-converging optical element OBJ, it is possible to correct spherical aberration caused by a difference of a protective layer thickness between HD-DVD and DVD.

When a laser light flux with wavelength $\lambda 3$ ($\lambda 3=0.785$ μm, in this case) emitted from an infrared semiconductor laser enters the superimposed-type diffractive structure HOE having the aforementioned structure, there is generated an optical path difference of $1\times\lambda 3$ μm between adjoining staircases because of $\lambda 3\approx 2\times\lambda 1$, and a laser light flux with wavelength $\lambda 3$ is also transmitted as it is, like the laser light flux with wavelength $\lambda 1$ because no phase difference is given to the laser light flux substantially (zero-order diffracted light).

When superimposed-type diffractive structure HOE is formed on light-converging optical element OBJ, it is possible to correct spherical aberration caused by a difference of a protective layer thickness between HD-DVD and DVD, by making the magnification for $\lambda 1$ and the magnification for $\lambda 3$ to be different each other, for the light-converging optical element OBJ.

Incidentally, in the present embodiment, it is not necessary to utilize the aforesaid wavelength selectivity of superimposed-type diffractive structure HOE, because only the first light flux passes through the first correcting element L1. However, when the first correcting element L1, for example, is arranged between the second beam splitter BS2 and light-converging optical element OBJ, the first-third light fluxes pass through the first correcting element L1. In this case, therefore, it is possible to contrive an arrangement wherein superimposed-type diffractive structure HOE is formed on the first correcting element L1, and thereby, wavelength selectivity of superimposed-type diffractive structure HOE is utilized so that the first light flux only may be subjected to diffractive effects and the second and third light fluxes may not be subjected to the diffractive effects.

As stated above, the first correcting element L1, the second correcting element L2 and optical pickup device PU1 shown in the present embodiment make it possible to prevent increase of wavefront aberration by controlling chromatic aberration of a light-converging optical element itself and of the first correcting element itself to be zero substantially, even when wavelength fluctuations are caused in the case of tracking in reproducing and/or recording for HD-DVD.

Further, by contriving an arrangement wherein light source unit LU23 in which the second light source LD2 and the third light source LD3 are united solidly is used, and the second light flux and the third light flux enter the second correcting element, it is possible to obtain sufficient amount of light and aberration controlling functions, by using diffracting structures provided respectively on the plane of incidence and the plane of emergence of the second correcting element L2.

Incidentally, as a combination of n1 and n2, any one of (n1, n2)=(0, 1), (2, 1), (3, 2), (5, 3) and (8, 5) is preferable, and as a combination of n1, n2 and n3, any one of (n1, n2, n3)=(0, 1, 0), (2, 1, 1), (3, 2, 2), (5, 3, 3) and (8, 5, 4) is preferable.

Second Embodiment

Next, there will be explained Second Embodiment of the invention, wherein an arrangement of each element constituting the present embodiment is the same as that in the aforesaid First Embodiment, for which an illustration is omitted, and the same structure is given the same symbol and an explanation thereof will be omitted.

In optical pickup device PU2 of the present embodiment, a diffractive structure is provided on each of first correcting element L1, second correcting element L2 and objective lens OBJ.

FIG. 3(b) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

It is shown that an absolute value of chromatic aberration owned by the light-converging optical element itself for the second light flux is made to be 0.25 μm/nm or less, namely, to be zero substantially, by the blaze-formed diffractive structure DOE formed on the light-converging optical element OBJ, as stated above.

Though an illustration will be omitted, an absolute value of chromatic aberration owned by the second light-converging optical element itself for the second light flux is made to be 3.5 µm/nm or less, namely, to be zero substantially, by the blaze-formed diffractive structure DOE formed on the second correcting element L2, as stated above.

In this way, by making chromatic aberration of the light-converging optical element itself for the second light flux and chromatic aberration of the second correcting element itself to be substantially zero respectively, it is possible to control chromatic aberration of the second light-converging spot in the case of using an optical pickup device to be within a range that is necessary for reproducing and/or recording of information.

If the blaze-formed diffractive structure DOE of the light-converging optical element OBJ is designed so that the chromatic aberration of the light-converging optical element itself for the second light flux may be substantially zero, the chromatic aberration of the light-converging optical element itself for the first light flux remains and a value of the chromatic aberration becomes positive specifically, as shown in FIG. 3(b).

In the present embodiment, therefore, the blaze-formed diffractive structure DOE of the first correcting element L1 is designed so that a value of chromatic aberration owned by the first correcting element itself for the first light flux may be negative, although an illustration thereof is omitted.

As stated above, by making positive chromatic aberration of the light-converging optical element itself for the first light flux to be cancelled by negative chromatic aberration of the first correcting element itself, it is possible to control chromatic aberration of the first light-converging spot in the case of using an optical pickup device to be within a range that is necessary for reproducing and/or recording of information.

As stated above, the first correcting element L1, the second correcting element L2 and optical pickup device PU2 shown in the present embodiment make it possible to prevent a change for the worse of wavefront aberration by controlling chromatic aberration of a light-converging optical element itself and of the first correcting element itself for the first light flux to be zero substantially, even when wavelength fluctuations are caused in the case of tracking in reproducing and/or recording for DVD.

Incidentally, in DVD, a demand for chromatic aberration correction is low, compared with HD-DVD, therefore, it is possible to control chromatic aberration of the second light-converging spot to be within a range necessary for reproducing and/or recording of information, even in the case of an arrangement where a diffractive structure is not provided on the second correcting element L2, and the second correcting element itself has chromatic aberration for the second light flux. In this case, a sufficient amount of light can be secured, because a loss of an amount of light in the occasion for the second light flux to pass through the diffractive ring-shaped zones is not caused.

Third Embodiment

Next, there will be explained Third Embodiment of the invention, wherein an arrangement of each element constituting the present embodiment is the same as that in the aforesaid First Embodiment, for which an illustration is omitted, and the same structure is given the same symbol and an explanation thereof will be omitted.

In optical pickup device PU3 of the present embodiment, a diffractive structure is provided on each of first correcting element L1, second correcting element L2 and objective lens OBJ.

FIG. 3(c) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

As is clear from FIG. 3(c), a value of chromatic aberration owned by the light-converging optical element itself for the first light flux is positive.

In the present embodiment, therefore, the blaze-formed diffractive structure DOE of the first correcting element L1 is designed so that a value of chromatic aberration owned by the first correcting element itself for the first light flux may be negative, although an illustration thereof is omitted.

As stated above, by making positive chromatic aberration of the light-converging optical element itself for the first light flux to be cancelled by negative chromatic aberration of the first correcting element itself, it is possible to control chromatic aberration of the first light-converging spot in the case of using an optical pickup device to be within a range that is necessary for reproducing and/or recording of information.

A value of chromatic aberration owned by the light-converging optical element itself for the second light flux is positive.

In the present embodiment, therefore, the blaze-formed diffractive structure DOE of the second correcting element L2 is designed so that a value of chromatic aberration owned by the second correcting element itself for the second light flux may be negative, although an illustration thereof is omitted.

As stated above, by making the positive chromatic aberration of the light-converging optical element itself for the second light flux to be cancelled by negative chromatic aberration of the second correcting element itself, it is possible to control chromatic aberration of the second light-converging spot in the case of using an optical pickup device to be within a range that is necessary for reproducing and/or recording of information.

As stated above, the first correcting element L1, the second correcting element L2 and optical pickup device PU3 shown in the present embodiment make it possible to make values of chromatic aberration owned by the light-converging optical element itself for the first and second light fluxes to be of the same signs (positive), and thereby to weaken diffractive effects of the blaze-formed diffractive structure DOE formed on light-converging optical element OBJ.

Therefore, an improvement of processability and reduction of a loss of an amount of light can be attained by expanding a pitch of diffraction.

Further, by contriving an arrangement wherein light source unit LU23 in which the second light source LD2 and the third light source LD3 are united solidly is used, and the second light flux and the third light flux enter the second correcting element, it is possible to obtain sufficient amount of light and aberration controlling functions in DVD and CD, by using a diffracting structure provided on the second correcting element L2.

Fourth Embodiment

Next, there will be explained Fourth Embodiment of the invention, wherein an arrangement of each element constituting the present embodiment is the same as that in the aforesaid First Embodiment, for which an illustration is omitted, and the same structure is given the same symbol and an explanation thereof will be omitted.

In optical pickup device PU4 of the present embodiment, a diffractive structure is provided on each of first correcting element L1, second correcting element L2 and objective lens OBJ.

FIG. 3(d) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

As is clear from FIG. 3(d), a value of chromatic aberration owned by the light-converging optical element itself for the first light flux is negative.

In the present embodiment, therefore, the blaze-formed diffractive structure DOE of the first correcting element L1 is designed so that a value of chromatic aberration owned by the first correcting element itself for the first light flux may be positive, although an illustration thereof is omitted.

As stated above, by making negative chromatic aberration of the light-converging optical element itself for the first light flux to be cancelled by positive chromatic aberration of the first correcting element itself, it is possible to control chromatic aberration of the first light-converging spot in the case of using an optical pickup device to be within a range that is necessary for reproducing and/or recording of information.

A value of chromatic aberration owned by the light-converging optical element itself for the second light flux is negative.

In the present embodiment, therefore, the blaze-formed diffractive structure DOE of the second correcting element L2 is designed so that a value of chromatic aberration owned by the second correcting element itself for the second light flux may be positive, although an illustration thereof is omitted.

As stated above, by making the negative chromatic aberration of the light-converging optical element itself for the second light flux to be cancelled by positive chromatic aberration of the second correcting element itself, it is possible to control chromatic aberration of the second light-converging spot in the case of using an optical pickup device to be within a range that is necessary for reproducing and/or recording of information.

Further, by contriving an arrangement wherein light source unit LU23 in which the second light source LD2 and the third light source LD3 are united solidly is used, and the second light flux and the third light flux enter the second correcting element, it is possible to obtain sufficient amount of light and aberration controlling functions in DVD and CD, by using a diffracting structure provided on the second correcting element L2.

Further, in DVD, a demand for chromatic aberration correction is low, compared with HD-DVD, therefore, it is possible to control chromatic aberration of the second light-converging spot to be within a range necessary for reproducing and/or recording of information, even in the case of an arrangement where a diffractive structure is not provided on the second correcting element L2, and the second correcting element itself has chromatic aberration for the second light flux. In this case, a sufficient amount of light can be secured, because a loss of an amount of light in the occasion for the second light flux to pass through the diffractive ring-shaped zones is not caused.

Fifth Embodiment

Next, there will be explained Fifth Embodiment of the invention, wherein an arrangement of each element constituting the present embodiment is the same as that in the aforesaid First Embodiment, for which an illustration is omitted, and the same structure is given the same symbol and an explanation thereof will be omitted.

In optical pickup device PU5 of the present embodiment, a diffractive structure is provided on each of second correcting element L2 and objective lens OBJ.

FIG. 3(e) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

As is clear from FIG. 3(e), a value of chromatic aberration owned by the light-converging optical element itself for the first light flux is positive, and this positive chromatic aberration is canceled by a value (negative) of chromatic aberration owned by the first correcting element itself for the first light flux in the structure, though an illustration thereof is omitted.

As stated above, by making the positive chromatic aberration of the light-converging optical element itself for the first light flux to be cancelled by negative chromatic aberration of the first correcting element itself, it is possible to control chromatic aberration of the first light-converging spot in the case of using an optical pickup device to be within a range that is necessary for reproducing and/or recording of information.

A value of chromatic aberration owned by the light-converging optical element itself for the second light flux is negative.

In the present embodiment, therefore, the blaze-formed diffractive structure DOE of the second correcting element L2 is designed so that a value of chromatic aberration owned by the second correcting element itself for the second light flux may be positive, although an illustration thereof is omitted.

As stated above, by making negative chromatic aberration of the light-converging optical element itself for the second light flux to be cancelled by positive chromatic aberration of the second correcting element itself, it is possible to control chromatic aberration of the second light-converging spot in the case of using an optical pickup device to be within a range that is necessary for reproducing and/or recording of information.

As stated above, in the present embodiment, a loss in an amount of light in the case for the first light flux to pass through the first correcting element is not caused, and processability can be improved.

Sixth Embodiment

FIG. 5 is a diagram showing schematically the structure of optical pickup device PU6 capable of conducting recording/reproducing of information properly for any one of HD-DVD (first optical information recording medium) and DVD (second optical information recording medium). The structure which is the same as that in the aforesaid First Embodiment is given the same symbol and an explanation thereof will be omitted.

Optical pickup device PU6 is composed of violet semiconductor laser LD1 (first light source) that emits a laser light flux (first light flux) with wavelength 407 nm that is emitted when conducting recording/reproducing of information for HD-DVD, photodetector PD1 for the first light flux, red semiconductor laser LD2 (second light source) that emits a laser light flux (second light flux) with wavelength 655 nm that is emitted when conducting recording/reproducing of information for DVD, photodetector PD2 for the second light flux, first correcting element L1 through which the first and second light fluxes pass, second correcting element L2 through which only the second light flux passes, objective lens (light-converging optical element) OBJ having a function to converge each laser light flux on each of information recording surfaces RL1 and RL2, first beam splitter BS1, second beam splitter BS2, third beam splitter BS3, diaphragm STO, and sensor lenses SEN1 and SEN2.

Incidentally, a diffractive structure is provided on each of the first correcting element L1, the second correcting element L2 and objective lens OBJ, for which the detailed explanation will be given later.

When conducting recording/reproducing of information for HD-DVD in optical pickup device PU6, violet semiconductor laser LD1 is first driven to emit light as shown in FIG. 5 where a light path is indicated. A divergent light flux emitted from the violet semiconductor laser LD1 passes through the first beam splitter BS1, then, is reflected on the second beam splitter BS2 and is transmitted through the first correcting element L1 to be converted into a collimated light flux, and arrives at light-converging optical element OBJ.

Then, $n1^{th}$ diffracted light (n1 is a natural number) of the first light flux generated by diffractive effects of the diffractive structure of the light-converging optical element OBJ is converged on information recording surface RL1 through protective layer PL1 of HD-DVD to form a spot (first light-converging spot). This first light-converging spot is controlled to be within a range necessary for reproducing and/or recording of information in terms of chromatic aberration, and an absolute value of chromatic aberration for the first light-converging spot is controlled specifically to be 0.15 μm/nm or less.

Then, the light-converging optical element OBJ conducts focusing and tracking with biaxial actuator AC (not shown) that is arranged on the periphery of the light-converging optical element OBJ. A reflected light flux modulated by information pits on information recording surface RL1 passes again through the light-converging optical element OBJ and the first correcting element L1, and is reflected on the second beam splitter BS2, then is branched by the first beam splitter BS1, and is given astigmatism by sensor lens SEN 1 to be converged on a light-receiving surface of photodetector PD 1. Thus, information recorded on HD-DVD by the use of output signals of the photodetector PD 1 can be read.

When conducting recording/reproducing of information for DVD, the red semiconductor laser LD2 is first driven to emit light as shown in FIG. 5 where a light path is indicated. A divergent light flux emitted from the red semiconductor laser LD2 passes through the second correcting element L2, the third beam splitter BS3 and the second beam splitter BS2, and then, is converted into a collimated light flux after being transmitted through the first correcting element L1, to arrive at light-converging optical element OBJ.

Then, $n2^{th}$ diffracted light (n2 is a natural number satisfying n1≠n2) of the second light flux generated by diffractive effects of the diffractive structure of light-converging optical element OBJ is converged on information recording surface RL2 through protective layer PL2 of DVD to form a spot (second light-converging spot). This second light-converging spot is controlled, in terms of chromatic aberration, to be within a range necessary for reproducing and/or recording of information, and an absolute value of chromatic aberration of the second light-converging spot is specifically controlled to be 0.25 μm/nm or less.

Then, the light-converging optical element OBJ conducts focusing and tracking with biaxial actuator AC that is arranged on the periphery of the light-converging optical element OBJ. A reflected light flux modulated by information pits on information recording surface RL2 passes again through the light-converging optical element OBJ, the first correcting element L1, the second beam splitter BS2 to be branched by the third beam splitter BS3, and is given astigmatism by sensor lens SEN 2, and is converged on the light-receiving surface of photodetector PD 2. Thus, information recorded on DVD can be read by the use of output signals of photodetector 2.

The light-converging optical element OBJ is a plastic single lens with aspheric surfaces on its both sides having a function to make the first and second light fluxes to be converged respectively on information recording surfaces RL1 and RL2. Incidentally, the light-converging optical element may also be constructed by combining a plurality of optical elements.

On a plane of incidence of the light-converging optical element OBJ, there is formed blaze-formed diffractive structure DOE shown in FIG. 2. The blaze-formed diffractive structure DOE is provided for the purpose of correcting chromatic aberration that is owned by light-converging optical element OBJ itself for the light flux emitted from the second light source, and it is designed specifically so that an absolute value of the chromatic aberration may be 0.25 μm/nm or less.

The first correcting element L1 has a collimating function to make the first light flux emitted from the first light source LD1 as a divergent light and the second light flux emitted from the second light source LD2 as a divergent light to emerge as collimated light, and on a plane of emergence of the first correcting element L1, there is formed blaze-formed diffractive structure DOE that is the same as one shown in FIG. 2.

On a plane of emergence of the second correcting element L2, there is formed blaze-formed diffractive structure DOE that is the same as one shown in FIG. 2.

FIG. 3(b) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

It is understood that an absolute value of chromatic aberration owned by the light-converging optical element itself for the second light flux is made to be 0.25 μm/nm or less, namely, to be zero substantially, by the blaze-formed diffractive structure DOE formed on the light-converging optical element OBJ, as stated above.

If the blaze-formed diffractive structure DOE of the light-converging optical element OBJ is designed so that the chromatic aberration of the light-converging optical element itself for the second light flux may be substantially zero, the chromatic aberration of the light-converging optical element for the first light flux remains and a value of the chromatic aberration becomes positive specifically, as shown in FIG. 3(b).

In the present embodiment, therefore, the blaze-formed diffractive structure DOE of the first correcting element L1 is designed so that a value of chromatic aberration owned by the first correcting element itself for the first light flux may be negative, although an illustration thereof is omitted.

As stated above, by making positive chromatic aberration of the light-converging optical element itself for the first light flux to be cancelled by negative chromatic aberration of the first correcting element itself, it is possible to control chromatic aberration of the first light-converging spot in the case of using an optical pickup device to be within a range that is necessary for reproducing and/or recording of information.

If the blaze-formed diffractive structure DOE of the first correcting element L1 is designed so that a value of the chromatic aberration owned by the first correcting element itself for the first light flux may be negative, the chromatic aberration of the first correcting element itself remains even for the second light flux, and a value of the chromatic aberration becomes negative specifically.

In the present embodiment, therefore, the blaze-formed diffractive structure DOE of the second correcting element L2 is designed so that a value of chromatic aberration owned by the second correcting element itself for the second light flux may be positive, although an illustration thereof is omitted.

As stated above, by making negative chromatic aberration of the first correcting element itself for the second light flux to be cancelled by positive chromatic aberration of the second correcting element itself, it is possible to control chromatic aberration of the second light-converging spot in the case of using an optical pickup device to be within a range that is necessary for reproducing and/or recording of information.

It is preferable that a combination of the n1 and n2 is any one of (n1, n2)=(0, 1), (2, 1), (3, 2), (5, 3) and (8, 5).

Seventh Embodiment

Next, there will be explained Seventh Embodiment of the invention, wherein an arrangement of each element-constituting the present embodiment is the same as that in the aforesaid Sixth Embodiment, for which an illustration is omitted, and the same structure is given the same symbol and an explanation thereof will be omitted.

In optical pickup device PU7 of the present embodiment, a diffractive structure is provided on each of the first correcting element L1, the second correcting element L2 and objective lens OBJ.

On the plane of incidence of light-converging optical element OBJ, there is formed blaze-formed diffractive structure DOE as shown in FIG. 2. The blaze-formed diffractive structure DOE is provided for the purpose of correcting chromatic aberration that is owned by light-converging optical element OBJ itself for the light flux emitted from the first light source, and it is designed specifically so that an absolute value of chromatic aberration may be 0.15 µm/nm or less.

FIG. 3(a) is a diagram showing the values of chromatic aberration owned by the light-converging optical element itself for the first light flux and the second light flux, in which the value of chromatic aberration owned by the light-converging optical element itself for the first light flux is shown with a circle, while, the value of chromatic aberration owned by the light-converging optical element itself for the second light flux is shown with a square.

As is clear from FIG. 3(a), an absolute value of chromatic aberration owned by the light-converging optical element itself for the first light flux is made by the blaze-formed diffractive structure DOE formed on the light-converging optical element to be 0.15 µm/nm or less, namely, to be zero substantially, as stated above.

Further, an absolute value of the chromatic aberration owned by the first correcting element itself for the first light flux is also made by the blaze-formed diffractive structure DOE formed on the first correcting element to be 2.1 µm/nm or less, namely, to be zero substantially, as stated above, though an illustration thereof will be omitted here.

As stated above, by making chromatic aberration of the light-converging optical system itself for the first light flux and chromatic aberration of the first correcting element itself to be zero substantially, it is possible to control chromatic aberration of the first light-converging spot in the case of using an optical pickup device to be within a range that is necessary for reproducing and/or recording of information.

If the blaze-formed diffractive structure DOE of the light-converging optical element is designed so that the chromatic aberration of the light-converging optical element itself for the first light flux may be substantially zero, the chromatic aberration of the light-converging optical element for the second light flux remains and a value of the chromatic aberration becomes negative specifically, as shown in FIG. 3(a).

If the blaze-formed diffractive structure DOE of the first correcting element L1 is designed so that a value of the chromatic aberration owned by the first correcting element itself for the first light flux may be zero substantially, the chromatic aberration of the first correcting element itself remains for the second light flux, and a value of the chromatic aberration becomes negative specifically.

In the present embodiment, therefore, the blaze-formed diffractive structure DOE of the second correcting element L2 is designed so that a value of chromatic aberration owned by the second correcting element itself for the second light flux may be positive, although an illustration thereof is omitted.

As stated above, by making negative chromatic aberration of the light-converging optical element itself for the second light flux and negative chromatic aberration of the first correcting element itself to be cancelled by positive chromatic aberration of the second correcting element itself, it is possible to control chromatic aberration of the second light-converging spot in the case of using an optical pickup device to be within a range that is necessary for reproducing and/or recording of information.

EXAMPLE 1

Next, the first example of each of the optical pickup device, the first correcting element and the second correcting element all shown in the aforementioned embodiment will be explained.

The present example is one relating to an optical pickup device wherein it is possible to control chromatic aberration of the first light-converging spot in the case of using an optical pickup device to be within a range that is necessary for reproducing and/or recording of information, by making the negative chromatic aberration of the light-converging optical element itself for the first light flux to be cancelled with positive chromatic aberration of the first correcting element itself, like the Fourth Embodiment stated above, and it is possible to control chromatic aberration of the second light-converging spot in the case of using an optical pickup device to be within a range that is necessary for reproducing and/or recording of information, by making negative chromatic aberration of the light-converging optical element itself for the second light flux to be cancelled by positive chromatic aberration of the second correcting element itself.

Lens data of respective optical elements are shown in Table 1 and Table 2.

TABLE 1

Example 1 Lens data

| | Focal length of objective lens | | $f_1$ = 3.1 mm | | $f_2$ = 3.19 mm | | $f_3$ = 3.16 mm | |
|---|---|---|---|---|---|---|---|---|
| | Image-side numerical aperture | | NA1: 0.65 | | NA2: 0.65 | | NA3: 0.51 | |

| $i^{th}$ surface | ri | di (407 nm) | ni (407 nm) | $i^{th}$ surface | ri | di (655 nm) | ni (655 nm) | di (785 nm) | ni (785 nm) |
|---|---|---|---|---|---|---|---|---|---|
| 0 | | 14.042794 | | 0 | | 14.034839 | | 14.034839 | |
| 1 | infinity | 6.25 | 1.52992 | 1 | infinity | 6.25 | 1.514362 | 6.25 | 1.51108 |
| 2 | infinity | 1 | 1.0 | 2 | infinity | 1 | 1.0 | 1 | 1.0 |
| 3 | 114.32953 | 1.5 | 1.559806 | 3 | −113.72283 | 1.5 | 1.540725 | 1.5 | 1.537237 |
| 4 | −13.92829 | 5 | 1.0 | 4 | −7.74527 | 5 | 1.0 | 5 | 1.0 |
| 5 (Aperture diameter) | ∞ | 0.1 (φ4.14 mm) | | | | 0.1 (φ4.15 mm) | | 0.1 (φ3.32 mm) | |
| 6 | 2.03647 | 1.73000 | 1.559806 | | | 1.73000 | 1.540725 | 1.73000 | 1.537237 |
| 7 | −13.53737 | 1.71 | 1.0 | | | 1.78 | 1.0 | 1.47 | 1.0 |
| 8 | ∞ | 0.6 | 1.61869 | | | 0.6 | 1.57752 | 1.2 | 1.57063 |
| 9 | ∞ | | | | | | | | |

* In the table, di represents a distance from the $i^{th}$ surface to the $(i + 1)^{th}$ surface.

TABLE 2

Aspheric surface data

First correcting element
Third surface

| Aspheric surface coefficient | κ | −6.6436 × E+1 |
|---|---|---|

Fourth surface (HD-DVD: First-order Blazed wavelength 1 mm)

| Aspheric surface coefficient | κ | −8.3465 × E−1 |
|---|---|---|
| Optical path difference function | C2 | −6.2961 × E−0 |
| | C4 | −1.5298 × E−2 |

Second correcting element
Third surface
(DVD: Second-order, CD: First-order Blazed wavelength 1 mm)

| Aspheric surface coefficient | κ | −1.0000 × E+3 |
|---|---|---|
| Optical path difference function | C2 | +2.4248 × E+0 |
| | C4 | +6.2330 × E−4 |

Fourth surface
(DVD: First-order, CD: First-order Blazed wavelength 1 mm)

| Aspheric surface coefficient | κ | −4.7604 × E−1 |
|---|---|---|
| Optical path difference function | C2 | +2.0944 × E+1 |
| | C4 | +1.2308 × E−1 |

Objective lens
Sixth surface
(AOD: Third-order, DVD: Second-order, CD: Second-order (HD-DVD: First-order Blazed wavelength 1 mm)

| Aspheric surface coefficient | κ | −4.4715 × E−1 |
|---|---|---|
| | A2 | −7.2396 × E−4 |
| | A4 | −1.3187 × E−3 |
| | A6 | +5.4370 × E−4 |
| | A8 | −1.0983 × E−4 |
| | A10 | +8.5286 × E−6 |
| | A12 | −1.3509 × E−6 |
| Optical path difference function | C2 | −8.1308 × E−0 |
| | C4 | −4.6175 × E−1 |
| | C6 | −2.8616 × E−1 |
| | C8 | +6.6346 × E−2 |
| | C10 | −7.9277 × E−3 |

Seventh surface

| Aspheric surface coefficient | κ | −4.1355 × E+2 |
|---|---|---|
| | A2 | −9.4311 × E−3 |
| | A4 | +1.1572 × E−2 |
| | A6 | −5.3553 × E−3 |
| | A8 | +1.2651 × E−3 |
| | A10 | −1.5851 × E−4 |
| | A12 | +8.2943 × E−6 |

As shown in Table 1, in the objective lens of the present example, focal length f1 and image-side numerical aperture NA1 both for wavelength λ1=407 nm are established respectively to be 3.1 mm and 0.65, focal length f2 and image-side numerical aperture NA2 both for wavelength λ2=655 nm are established respectively to be 3.19 mm and 0.65, and focal length f3 and image-side numerical aperture NA3 both for wavelength λ3=785 nm are established respectively to be 3.16 mm and 0.51.

Further, in the present example, a blaze-formed diffractive structure is formed on a plane of emergence (fourth surface) of the first correcting element, a plane of incidence (third surface) and a plane of emergence (fourth surface) both of the second correcting element, and on a plane of incidence (sixth surface) of a light-converging optical element (objective lens).

In the constitution, magnifications m1 and m2 of the objective lens for the first light flux and the second light flux are zero substantially, the first light flux and the second light flux enter the objective lens as parallel rays, magnification m3 for the third light flux is negative, and the third light flux enters the objective lens as divergent rays.

On each of a plane of incidence (third surface) and a plane of emergence (fourth surface) of the first correcting element, a plane of incidence (third surface) and a plane of emergence (fourth surface) of the second correcting element and on a plane of incidence (sixth surface) and a plane of emergence (seventh surface) of the light-converging optical element (objective lens), there is formed an aspheric surface that is stipulated by the expression wherein the coefficients shown in Tables 1 and 2 are substituted in the following expression (Numeral 1), and is axially symmetric around optical axis L.

(Numeral 1)

Expression of aspheric form $$X(h) = \frac{(h^2/R)}{1 + \sqrt{1 - (1+\kappa)(h/R)^2}} + \sum_{i=0}^{9} + A_{2i}h^{2i}$$

In the expression above, X (h) represents an axis in the optical axis direction (advancing direction of light is positive), κ represents a conic constant and $A_{2i}$ represents a coefficient of aspheric surface.

Further, a pitch of the diffractive ring-shaped zones is stipulated by the expression wherein a coefficient shown in Table 2 is substituted in the optical path difference function of Numeral 2.

(Numeral 2)

Optical path difference function $$\phi(h) = \left(\sum_{i=0}^{5} B_{2i} h^{2i}\right) \times n \times \lambda/\lambda B$$

In the expression above, $B_{2i}$ represents a coefficient of the optical path difference function, $\lambda$ represents a working wavelength and $\lambda B$ represents the blazed wavelength ($\lambda B=1$ mm) for diffraction.

EXAMPLE 2

Next, the second example of each of the optical pickup device, the first correcting element and the second correcting element all shown in the aforementioned embodiment will be explained.

The present example is one relating to an optical pickup-device wherein it is possible to control chromatic aberration of the first light-converging spot in the case of using an optical pickup device to be within a range that is necessary for reproducing and/or recording of information, by making the chromatic aberration of the light-converging optical element for the first light source itself and the chromatic aberration of the first correcting element itself to be zero substantially, like the First Embodiment, and it is possible to control chromatic aberration of the second light-converging spot in the case of using an optical pickup device to be within a range that is necessary for reproducing and/or recording of information, by making negative chromatic aberration of the light-converging optical element itself for the second light flux to be cancelled by positive chromatic aberration of the second correcting element itself.

Lens data of respective optical elements are shown in Table 3 and Table 4.

TABLE 4

Aspheric surface data

| First correcting element Third surface | | |
|---|---|---|
| Aspheric surface coefficient | κ | −2.9816 × E+0 |
| Fourth surface (HD-DVD: First-order Blazed wavelength 1 mm) | | |
| Aspheric surface coefficient | κ | −6.6298 × E−1 |
| | A2 | +6.8060 × E−4 |
| | A4 | +4.2157 × E−7 |
| Optical path difference function | C2 | +1.6953 × E+1 |
| | C4 | +9.7909 × E−1 |
| Second correcting element Third surface | | |
| Aspheric surface coefficient | κ | −6.8225 × E−0 |
| Fourth surface (DVD: First-order, CD: First-order Blazed wavelength 1 mm) | | |
| Aspheric surface coefficient | κ | −8.8682 × E−1 |
| Optical path difference function | C2 | +3.4941 × E+1 |
| | C4 | +2.0110 × E−2 |
| Objective lens Sixth surface (AOD: Third-order, DVD: Second-order, CD: Second-order Blazed wavelength 1 mm) | | |
| Aspheric surface coefficient | κ | −4.3741 × E−1 |
| | A2 | +1.1713 × E−4 |
| | A4 | −1.2104 × E−3 |
| | A6 | +5.3927 × E−4 |
| | A8 | −1.1589 × E−4 |
| | A10 | +1.1395 × E−5 |
| | A12 | −1.3946 × E−6 |
| Optical path difference function | C2 | −1.7589 × E+1 |
| | C4 | −6.7834 × E−1 |
| | C6 | −2.1641 × E−1 |
| | C8 | +3.2057 × E−2 |
| | C10 | −3.4960 × E−3 |
| Seventh surface | | |
| Aspheric surface coefficient | κ | −1.1243 × E+3 |
| | A2 | −7.9648 × E−3 |
| | A4 | +1.1269 × E−2 |
| | A6 | −5.3948 × E−3 |
| | A8 | +1.2875 × E−3 |
| | A10 | −1.6243 × E−4 |
| | A12 | +8.5641 × E−6 |

TABLE 3

Example 2 Lens data

| Focal length of objective lens | | $f_1 = 3.1$ mm | | $f_2 = 3.16$ mm | | $f_3 = 3.09$ mm | |
|---|---|---|---|---|---|---|---|
| Image-side numerical aperture | | NA1: 0.65 | | NA2: 0.65 | | NA3: 0.51 | |
| i$^{th}$ surface | ri | di (407 nm) | ni (407 nm) | i$^{th}$ surface | ri | di (655 nm) | ni (655 nm) | di (785 nm) | ni (785 nm) |
| 0 | | 14.189265 | | 0 | | 14.253152 | | 14.253152 | |
| 1 | infinity | 6.25 | 1.52992 | 1 | infinity | 6.25 | 1.514362 | 6.25 | 1.51108 |
| 2 | infinity | 1 | 1.0 | 2 | infinity | 1 | 1.0 | 1 | 1.0 |
| 3 | 43.71519 | 1.5 | 1.559806 | 3 | 28.81402 | 1.5 | 1.540725 | 1.5 | 1.537237 |
| 4 | −10.87889 | 5 | 1.0 | 4 | −6.96923 | 5 | 1.0 | 5 | 1.0 |
| 5 (Aperture diameter) | ∞ | 0.1 (φ4.14 mm) | | | | 0.1 (φ4.15 mm) | | 0.1 (φ3.25 mm) | |
| 6 | 2.15303 | 1.73000 | 1.559806 | | | 1.73000 | 1.540725 | 1.73000 | 1.537237 |
| 7 | −18.94537 | 1.69 | 1.0 | | | 1.78 | 1.0 | 1.36 | 1.0 |
| 8 | ∞ | 0.6 | 1.618689 | | | 0.6 | 1.57752 | 1.2 | 1.57063 |
| 9 | ∞ | | | | | | | | |

\* In the table, di represents a distance from the i$^{th}$ surface to the (i + 1)$^{th}$ surface.

As shown in Table 3, in the objective lens of the present example, focal-length f1 and image-side numerical aperture NA1 both for wavelength λ1=407 nm are established respectively to be 3.1 mm and 0.65, focal length f2 and image-side numerical aperture NA2 both for wavelength λ2=655 nm are established respectively to be 3.19 mm and 0.65, and focal length f3 and image-side numerical aperture NA3 both for wavelength λ3=785 nm are established respectively to be 3.16 mm and 0.51.

Further, in the present example, a blaze-formed diffractive structure is formed on a plane of emergence (fourth surface) of the first correcting element, a plane of emergence (fourth surface) of the second correcting element and a plane of incidence (sixth surface) of the light-converging optical element.

In the constitution, magnifications m1 and m2 of the objective lens for the first light flux and the second light flux are zero substantially, the first light flux and the second light flux enter the objective lens as parallel rays, magnification m3 for the third light flux is negative, and the third light flux enters the objective lens as divergent rays.

On each of a plane of incidence (third surface) and a plane of emergence (fourth surface) of the first correcting element, a plane of incidence (third surface) and a plane of emergence (fourth surface) of the second correcting element and on a plane of incidence (sixth surface) and a plane of emergence (seventh surface) of the light-converging optical element (objective lens), there is formed an aspheric surface that is stipulated by the expression wherein the coefficients shown in Tables 3 and 4 are substituted in the aforesaid Numeral 1, and is axially symmetric around optical axis L.

A pitch of the diffractive ring-shaped zones is stipulated by the expression wherein a coefficient shown in Table 4 is substituted in the optical path difference function of the Numeral 2.

EXAMPLE 3

Next, the third example of each of the optical pickup device, the first correcting element and the second correcting element all shown in the aforementioned embodiment will be explained.

The present example is one relating to an optical pickup device wherein it is possible to control chromatic aberration of the second light-converging spot in the case of using an optical pickup device to be within a range that is necessary for reproducing and/or recording of information, by making the chromatic aberration of the light-converging optical element for the second light flux itself and the chromatic aberration of the second correcting element itself to be zero substantially, like the aforesaid Second Embodiment, and it is possible to control chromatic aberration of the first light-converging spot in the case of using an optical pickup device to be within a range that is necessary for reproducing and/or recording of information, by making negative chromatic aberration of the light-converging optical element itself for the first light flux to be cancelled by positive chromatic aberration of the first correcting element itself.

Lens data of respective optical elements are shown in Table 5 and Table 6.

TABLE 5

| Example 3 Lens data | | | | | | | | | |
|---|---|---|---|---|---|---|---|---|---|
| Focal length of objective lens | | | $f_1$ = 3.1 mm | | $f_2$ = 3.21 mm | | $f_3$ = 3.23 mm | | |
| Image-side numerical aperture | | | NA1: 0.65 | | NA2: 0.65 | | NA3: 0.51 | | |
| $i^{th}$ surface | ri | di (407 nm) | ni (407 nm) | $i^{th}$ surface | ri | di (655 nm) | ni (655 nm) | di (785 nm) | ni (785 nm) |
| 0 | | 13.81389 | | 0 | | 13.89454 | | 13.89454 | |
| 1 | infinity | 6.25 | 1.52992 | 1 | infinity | 6.25 | 1.514362 | 6.25 | 1.51108 |
| 2 | infinity | 1 | 1.0 | 2 | infinity | 1 | 1.0 | 1 | 1.0 |
| 3 | −73.50459 | 1.5 | 1.559806 | 3 | −2491.104 | 1.5 | 1.540725 | 1.5 | 1.537237 |
| 4 | −19.48555 | 5 | 1.0 | 4 | −16.73854 | 5 | 1.0 | 5 | 1.0 |
| 5 | ∞ | 0.1 | | | | 0.1 | | 0.1 | |
| (Aperture diameter) | | (φ4.14 mm) | | | | (φ4.17 mm) | | (φ3.36 mm) | |
| 6 | 1.94790 | 1.73000 | 1.559806 | | | 1.73000 | 1.540725 | 1.73000 | 1.537237 |
| 7 | −10.83691 | 1.74 | 1.0 | | | 1.83 | 1.0 | 1.54 | 1.0 |
| 8 | ∞ | 0.6 | 1.618689 | | | 0.6 | 1.57752 | 1.2 | 1.57063 |
| 9 | ∞ | | | | | | | | |

\* In the table, di represents a distance from the $i^{th}$ surface to the $(i + 1)^{th}$ surface.

TABLE 6

Aspheric surface data

First correcting element
Third surface

| Aspheric surface coefficient | κ | −1.2865 × E−1 |
|---|---|---|

Fourth surface (HD-DVD: First-order Blazed wavelength 1 mm)

| Aspheric surface coefficient | κ | −5.6016 × E−0 |
|---|---|---|
| | A2 | −1.2220 × E−4 |
| | A4 | +8.2772 × E−7 |
| Optical path difference function | C2 | −3.4973 × E+1 |
| | C4 | −3.1167 × E−1 |

Second correcting element
Third surface

| Aspheric surface coefficient | κ | +5.0000 × E−0 |
|---|---|---|

Fourth surface
(DVD: Second-order, CD: First-order Blazed wavelength 1 mm)

| Aspheric surface coefficient | κ | −3.0979 × E−1 |
|---|---|---|
| Optical path difference function | C2 | −6.8329 × E−0 |
| | C4 | −9.6489 × E−4 |

TABLE 6-continued

Aspheric surface data

Objective lens
Sixth surface
(AOD: Third-order, DVD: Second-order, CD: Second-order
Blazed wavelength 1 mm)

| Aspheric surface coefficient | κ | −4.6387 × E−1 |
|---|---|---|
| | A2 | −1.8195 × E−4 |
| | A4 | −1.9297 × E−3 |
| | A6 | +7.6730 × E−4 |
| | A8 | −1.4669 × E−4 |
| | A10 | +4.2269 × E−6 |
| | A12 | −3.3768 × E−7 |
| Optical path difference function | C2 | 0 |
| | C4 | −4.3190 × E−1 |
| | C6 | −2.3777 × E−1 |
| | C8 | +7.3114 × E−2 |
| | C10 | −1.0422 × E−2 |

Seventh surface

| Aspheric surface coefficient | κ | −2.8743 × E+2 |
|---|---|---|
| | A2 | −9.7882 × E−3 |
| | A4 | +1.1311 × E−2 |
| | A6 | −5.3137 × E−3 |
| | A8 | +1.2888 × E−3 |
| | A10 | −1.6378 × E−4 |
| | A12 | +8.6619 × E−6 |

As shown in Table 5, in the objective lens of the present example, focal length f1 and image-side numerical aperture NA1 both for wavelength $\lambda 1=407$ nm are established respectively to be 3.1 mm and 0.65, focal length f2 and image-side numerical aperture NA2 both for wavelength $\lambda 2=655$ nm are established respectively to be 3.21 mm and 0.65, and focal length f3 and image-side numerical aperture NA3 both for wavelength $\lambda 3=785$ nm are established respectively to be 3.23 mm and 0.51.

Further, in the present example, a blaze-formed diffractive structure is formed on a plane of emergence (fourth surface) of the first correcting element, a plane of emergence (fourth surface) of the second correcting element and a plane of incidence (sixth surface) of the light-converging optical element.

In the constitution, magnifications m1 and m2 of the objective lens for the first light flux and the second light flux are zero substantially, the first light flux and the second light flux enter the objective lens as parallel rays, magnification m3 for the third light flux is negative, and the third light flux enters the objective lens as divergent rays.

On each of a plane of incidence (third surface) and a plane of emergence (fourth surface) of the first correcting element, a plane of incidence (third surface) and a plane of emergence (fourth surface) of the second correcting element and on a plane of incidence (sixth surface) and a plane of emergence (seventh surface) of the light-converging optical element (objective lens), there is formed an aspheric surface that is stipulated by the expression wherein the coefficients shown in Tables 5 and 6 are substituted in the aforesaid Numeral 1, and is axially symmetric around optical axis L.

A pitch of the diffractive ring-shaped zones is stipulated by the expression wherein a coefficient shown in Table 6 is substituted in the optical path difference function of the Numeral 2.

EXAMPLE 4

Next, the fourth example of each of the optical pickup device, the first correcting element and the second correcting element all shown in the aforementioned embodiment will be explained.

The present example is one relating to an optical pickup device wherein it is possible to control chromatic aberration of the second light-converging spot in the case of using an optical pickup device to be within a range that is necessary for reproducing and/or recording of information, by making the negative chromatic aberration of the first correcting element for the second light flux by the positive chromatic aberration of the second correcting element itself, and it is possible to control chromatic aberration of the first light-converging spot in the case of using an optical pickup device to be within a range that is necessary for reproducing and/or recording of information, by making positive chromatic aberration of the light-converging optical element itself for the first light flux to be cancelled by negative chromatic aberration of the first correcting element itself.

Lens data of respective optical elements are shown in Table 7 and Table 8.

TABLE 7

Example 4 Lens data

| | Focal length of objective lens | | $f_1$ = 3.1 mm | | $f_2$ = 3.19 mm | |
|---|---|---|---|---|---|---|
| | Image-side numerical aperture | | NA1: 0.65 | | NA2: 0.65 | |
| $i^{th}$ surface | ri | di (407 nm) | ni (407 nm) | $i^{th}$ surface | ri | di (661 nm) | ni (661 nm) |
| 0 | | 16.115 | | 0 | | 13.264 | |
| 1 | infinity | 0 | 1.0 | 1 | 20.842 | 1 | 1.539169 |
| 2 | infinity | 0 | 1.0 | 2 | −15.336 | 1.5 | 1.0 |
| 3 | infinity | 4.75 | 1.529942 | 3 | infinity | 4.75 | 1.514176 |
| 4 | infinity | 1.5 | 1.0 | 4 | infinity | 1.5 | 1.0 |
| 5 | −66.747 | 1.7 | 1.558311 | | | 1.7 | 1.539169 |
| 6 | −20.197 | 5 | 1.0 | | | 5 | 1.0 |
| 7 | ∞ | 0.1 | 1.0 | | | 0.1 | 1.0 |
| (Aperture diameter) | | (φ4.173 mm) | | | | (φ4.173 mm) | |
| 8' | 1.9764 | 1.1327E−02 | 1.558311 | | | 1.1327E−02 | 1.539169 |
| 8 | 1.9638 | 1.76000 | 1.558311 | | | 1.76000 | 1.539169 |
| 9 | −10.743 | 1.72 | 1.0 | | | 1.80 | 1.0 |
| 10 | ∞ | 0.6 | 1.618334 | | | 0.6 | 1.577114 |
| 11 | ∞ | | | | | | |

* In the table, di represents a distance from the $i^{th}$ surface to the $(i + 1)^{th}$ surface.

TABLE 8

Correcting element for DVD

Second surface

| | | |
|---|---|---|
| Optical path difference function (DVD: First-order Blazed wavelength 661 nm) | C2 | 2.6331E−02 |
| | C4 | 1.2847E−04 |

Collimator to be used commonly for HD-DVD/DVD
Sixth surface (HD-DVD: Fifth-order, DVD: Third-order Blazed wavelength 407.9 nm)

| | | |
|---|---|---|
| Aspheric surface coefficient | κ | −1.0000E−01 |
| | A1 | −9.6629E−06 |
| | A2 | −2.5101E−08 |
| Optical path difference function | C2 | −2.4248 × E+0 |

Objective lens
Eighth surface (1.015 mm ≦ h)

| | | |
|---|---|---|
| Aspheric surface coefficient | κ | −5.7409E−01 |
| | A1 | 7.1066E−04 |
| | A2 | −2.4404E−03 |
| | A3 | 1.1090E−03 |
| | A4 | −1.9304E−04 |
| | A5 | 1.4092E−05 |
| | A6 | −7.7600E−07 |
| Optical path difference function (DVD: First-order Blazed wavelength 661 nm) | C2 | −2.5443E−03 |
| | C4 | −7.4686E−04 |
| | C6 | −4.8639E−04 |
| | C8 | 1.2462E−04 |
| | C10 | −7.6259E−06 |

Eighth surface (0 mm ≦ h < 1.015 mm)

| | | |
|---|---|---|
| Aspheric surface coefficient | κ | −5.4894E−01 |
| | A1 | 1.0603E−03 |
| | A2 | −1.3250E−03 |
| | A3 | 5.0847E−04 |
| | A4 | −3.9760E−05 |
| | A5 | −1.4261E−05 |
| | A6 | 1.1184E−06 |
| Optical path difference function (HD DVD: Third-order, DVD: Second-order Blazed wavelength 417 nm) | C2 | −5.4303E−04 |
| | C4 | −5.8842E−05 |
| | C6 | −1.7645E−04 |
| | C8 | 5.1044E−05 |
| | C10 | −6.1711E−06 |

Ninth surface

| | | |
|---|---|---|
| Aspheric surface coefficient | κ | −2.2653E+02 |
| | A1 | −8.3958E−03 |
| | A2 | 1.0917E−02 |
| | A3 | −5.3410E−03 |
| | A4 | 1.3141E−03 |
| | A5 | −1.6618E−04 |
| | A6 | 8.5718E−06 |

| | nd (Refractive index for d line) | vd (Abbe's number for d line) |
|---|---|---|
| Material of the first surface | 1.5422 | 56.5 |
| Material of the fifth surface | 1.5422 | 56.5 |
| Material of the eighth surface | 1.5422 | 56.5 |
| Material of 8'th surface | 1.5422 | 56.5 |

As shown in Table 7, in the objective lens of the present example, focal length f1 and image-side numerical aperture NA1 both for wavelength λ1=407.9 nm are established respectively to be 3.1 mm and 0.65 and focal length f2 and image-side numerical aperture NA2 both for wavelength λ2=661 nm are established respectively to be 3.19 mm and 0.65.

Further, in the present example, a blaze-formed diffractive structure is formed on each of a plane of emergence (sixth surface) of the first correcting element, a plane of emergence (second surface) of the second correcting element and on a plane of incidence (eighth surface, $8'^{th}$ surface) of the light-converging optical element (objective lens).

In the constitution, magnifications m1 and m2 of the objective lens for the first light flux and the second light flux are zero substantially, and the first light flux and the second light flux enter the objective lens as parallel rays.

On each of a plane of emergence (sixth surface) of the first correcting element and planes of incidence ($8^{th}$ and $8'^{th}$ surfaces) and a plane of emergence (ninth surface) of the light-converging optical element (objective lens), there is formed an aspheric surface that is stipulated by the expression wherein the coefficients shown in Tables 7 and 8 are substituted in the aforesaid Numeral 1, and is axially symmetric around optical axis L.

A pitch of the diffractive ring-shaped zones is stipulated by the expression wherein a coefficient shown in Table 8 is substituted in the optical path difference function of the Numeral 2.

EXAMPLE 5

Next, the fifth example of each of the optical pickup device, the first correcting element and the second correcting element all shown in the aforementioned embodiment will be explained.

The present example is one relating to an optical pickup device wherein it is possible to control chromatic aberration of the first light-converging spot in the case of using an optical pickup device to be within a range that is necessary for reproducing and/or recording of information, by making the chromatic aberration of the light-converging optical element itself for the first light flux and chromatic aberration of the first correcting element itself to be zero substantially, and it is possible to control chromatic aberration of the second light-converging spot in the case of using an optical pickup device to be within a range that is necessary for reproducing and/or recording of information, by making negative chromatic aberration of the light-converging optical element itself for the second light flux and negative chromatic aberration of the first correcting element itself to be cancelled by positive chromatic aberration of the second correcting element itself.

Lens data of respective optical elements are shown in Table 9 and Table 10.

TABLE 9

Example 5 Lens data

| | Focal length of objective lens | $f_1$ = 3.1 mm | | $f_2$ = 3.21 mm | |
|---|---|---|---|---|---|
| | Image-side numerical aperture | NA1: 0.65 | | NA2: 0.65 | |

| $i^{th}$ surface | ri | di (407 nm) | ni (407 nm) | $i^{th}$ surface | ri | di (665 nm) | ni (665 nm) |
|---|---|---|---|---|---|---|---|
| 0 | | 14.903 | | 0 | | 12.024 | |
| 1 | infinity | 0 | 1.0 | 1 | infinity | 1 | 1.540725 |
| 2 | infinity | 0 | 1.0 | 2 | −10.551 | 2 | 1.0 |
| 3 | infinity | 4.75 | 1.529942 | | | 4.75 | 1.514176 |
| 4 | infinity | 2 | 1.0 | | | 2 | 1.0 |
| 5 | 123.02 | 1.7 | 1.558456 | | | 1.7 | 1.539375 |
| 6 | −14.437 | 5 | 1.0 | | | 5 | 1.0 |
| 7 (Aperture diameter) | ∞ | 0.1 (φ4.03 mm) | 1.0 | | | 0.1 (φ4.147 mm) | 1.0 |
| 8 | 2.0635 | 1.73000 | 1.559806 | | | 1.73000 | 1.540725 |
| 9 | −13.537 | 1.72 | 1.0 | | | 1.78 | 1.0 |
| 10 | ∞ | 0.6 | 1.618689 | | | 0.6 | 1.577521 |
| 11 | ∞ | | | | | | |

* In the table, di represents a distance from the $i^{th}$ surface to the $(i + 1)^{th}$ surface.

TABLE 10

Aspheric surface data

| Correcting element for DVD Second surface | | |
|---|---|---|
| Optical path difference function (DVD: First-order Blazed wavelength 655 nm) | C2 | 2.2008E−02 |
| | C4 | 1.0027E−04 |
| Collimator to be used commonly for HD-DVD/DVD Sixth surface | | |
| Aspheric surface coefficient | κ | −1.0000E−01 |
| | A1 | 2.4710E−05 |
| | A2 | 1.1294E−07 |
| Optical path difference function (HD-DVD: Second-order, DVD: First-order Blazed wavelength 407 nm) | C2 | −1.1527E−03 |
| Objective lens Eighth surface | | |
| Aspheric surface coefficient | κ | −4.4715E−01 |
| | A1 | −7.2396E−04 |
| | A2 | −1.3187E−03 |
| | A3 | 5.4370E−04 |
| | A4 | −1.0983E−04 |
| | A5 | 8.5286E−06 |
| | A6 | −1.3509E−06 |
| Optical path difference function (HD DVD: Third-order, DVD: Second-order Blazed wavelength 422 nm) | C2 | −3.4312E−03 |
| | C4 | −1.9486E−04 |
| | C6 | −1.2076E−04 |
| | C8 | 2.7998E−05 |
| | C10 | −3.3455E−06 |
| Ninth surface | | |
| Aspheric surface coefficient | κ | −4.1355E+02 |
| | A1 | −9.4311E−03 |
| | A2 | 1.1572E−02 |
| | A3 | −5.3553E−03 |
| | A4 | 1.2651E−03 |
| | A5 | −1.5851E−04 |
| | A6 | 8.2943E−06 |

| | nd (Refractive index for d line) | vd (Abbe's number for d line) |
|---|---|---|
| Material of the first surface | 1.5435 | 56.7 |

TABLE 10-continued

Aspheric surface data

| | | |
|---|---|---|
| Material of the fifth surface | 1.5422 | 56.5 |
| Material of the eighth surface | 1.5435 | 56.7 |

As shown in Table 9, in the objective lens of the present example, focal length f1 and image-side numerical aperture NA1 both for wavelength λ1=407 nm are established respectively to be 3.1 mm and 0.65 and focal length f2 and image-side numerical aperture NA2 both for wavelength λ2=655 nm are established respectively to be 3.21 mm and 0.65.

Further, in the present example, a blaze-formed diffractive structure is formed on each of a plane of emergence (sixth surface) of the first correcting element, a plane of emergence (second surface) of the second correcting element and on a plane of incidence (eighth surface) of the light-converging optical element (objective lens).

In the constitution, magnifications m1 and m2 of the objective lens for the first light flux and the second light flux are zero substantially, and the first light flux and the second light flux enter the objective lens as parallel rays.

On each of a plane of emergence (sixth surface) of the first correcting element and a plane of incidence (eighth surface) and a plane of emergence (ninth surface) of the light-converging optical element (objective lens), there is formed an aspheric surface that is stipulated by the expression wherein the coefficients shown in Tables 9 and 10 are substituted in the aforesaid Numeral 1, and is axially symmetric around optical axis L.

A pitch of the diffractive ring-shaped zones is stipulated by the expression wherein a coefficient shown in Table 10 is substituted in the optical path difference function of the Numeral 2.

Table 11 shows chromatic aberration (abbreviated as HD-DVD) for the first light flux in the combination of the objective lens and the first correcting element and chromatic aberration (abbreviated as DVD) for the second light flux in the combination of the objective lens and the second correcting element, in Examples 1-3.

TABLE 11

Chromatic aberration (μm/nm) in the case of combination of objective lens and correcting element

|  | HD DVD | DVD |
|---|---|---|
| Example 1 | 0.04 | −0.02 |
| Example 2 | 0.04 | −0.01 |
| Example 3 | −0.01 | −0.19 |

It is understood from Table 11 that chromatic aberrations for HD-DVD and DVD in Examples 1-3 are controlled to be within a range wherein the chromatic aberration is not problematic in practical use.

Table 12 shows chromatic aberration (abbreviated as HD-DVD) for the first light flux in the combination of the objective lens and the first correcting element and chromatic aberration (abbreviated as DVD) for the second light flux in the combination of the objective lens, the first correcting element and the second correcting element, in Examples 4 and 5.

TABLE 12

Chromatic aberration (μm/nm) in the case of combination of objective lens and correcting element

|  | HD DVD | DVD |
|---|---|---|
| Example 4 | 0 | 0.02 |
| Example 5 | 0.1 | −0.08 |

It is understood from Table 12 that chromatic aberrations for HD-DVD and DVD in Examples 4 and 5 are controlled to be within a range wherein the chromatic aberration is not problematic in practical use.

Incidentally, in the examples stated above, HD-DVD has been exemplified as a high density optical disc. However, the high density optical disc is not limited to HD-DVD, in the invention.

It is to be noted that various changes and modifications will be apparent to those skilled in the art. Therefore, unless such changes and modifications depart from the scope of the present invention, they should be construed as being included therein.

What is claimed is:

1. An optical pickup device comprising:
   a first light source emitting a light flux with wavelength $\lambda 1$ (380 nm $\leq \lambda 1 \leq$ 450 nm);
   a second light source emitting a light flux with wavelength $\lambda 2$ (600 nm $\leq \lambda 2 \leq$ 700 nm);
   a light-converging optical element having a diffractive structure through which the light flux with wavelength $\lambda 1$ and the light flux with wavelength $\lambda 2$ pass;
   a first correcting element having a diffractive structure through which at least the light flux with wavelength $\lambda 1$ passes;
   a second correcting element having a diffractive structure through which at least the light flux with wavelength $\lambda 2$ passes; and
   a beam splitter that makes an optical path for the light flux with wavelength $\lambda 1$ and that for the light flux with wavelength $\lambda 2$ to agree with each other in terms of their positions;
   wherein reproducing and/or recording of information is conducted on the first optical information recording medium having protective substrate thickness t1 (0 mm<t1$\leq$0.7 mm), by the use of the light flux with wavelength $\lambda 1$,
   reproducing and/or recording of information is conducted on the second optical information recording medium having protective substrate thickness t2 (0.5 mm$\leq$t2$\leq$0.7 mm), by the use of the light flux with wavelength $\lambda 2$,
   at least one of the first correcting element and the second correcting element is arranged between the beam splitter and the first light source or between the beam splitter and the second light source,
   the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration,
   an absolute value of chromatic aberration owned by the light-converging optical element itself is controlled to be 0.15 μm/nm or less for the light flux emitted from the first light source, and
   an absolute value of chromatic aberration owned by the first correcting element itself is controlled to be 2.1 μm/nm or less for the light flux emitted from the first light source.

2. The optical pickup device of claim 1, wherein the light-converging optical element is made of plastic.

3. The optical pickup device of claim 1, wherein the first correcting element is made of plastic.

4. The optical pickup device of claim 1, wherein the second correcting element is made of plastic.

5. The optical pickup device of claim 1, wherein focal length f of the light-converging optical element for the light flux with wavelength $\lambda 1$ is made to satisfy 1 mm$\leq$f$\leq$4 mm.

6. The optical pickup device of claim 1, wherein focal length f1 of the first correcting element for the light flux with wavelength $\lambda 1$ is made to satisfy 5.5 mm$\leq$f1$\leq$32 mm.

7. The optical pickup device of claim 1, wherein focal length f2 of the second correcting element for the light flux with wavelength $\lambda 2$ is made to satisfy 5.5 mm$\leq$f12$\leq$32 mm.

8. The optical pickup device of claim 1, wherein magnification m1 of the optical system including the first light source up to the first optical information recording medium for the light flux with wavelength $\lambda 1$ is made to satisfy $-\frac{1}{3} \leq m1 \leq -\frac{1}{10}$.

9. The optical pickup device of claim 1, wherein magnification m2 of the optical system including the second light source up to the second optical information recording medium is made to satisfy $-\frac{1}{3} \leq m2 \leq -\frac{1}{10}$.

10. The optical pickup device of claim 1, wherein image-surface-side numerical aperture NA1 of the light-converging optical element for the light flux with wavelength $\lambda 1$ in the case of using the optical pickup device is made to satisfy 0.63$\leq$NA1$\leq$0.67.

11. The optical pickup device of claim 1, wherein image-surface-side numerical aperture NA2 of the light-converging optical element for the light flux with wavelength λ2 in the case of using the optical pickup device is made to satisfy 0.59≦NA2≦0.67.

12. The optical pickup device of claim 1, wherein at least one of the first correcting element and the second correcting element is made to be a collimator.

13. The optical pickup device of claim 1, wherein a combination of the n1 and n2 is made to be any one of (n1, n2)=(0, 1), (2, 1), (3, 2), (5, 3) and (8, 5).

14. The optical pickup device of claim 1, further comprising:
a third light source emitting a light flux with wavelength λ3 (750 nm≦λ3≦800 nm),
wherein reproducing and/or recording of information is conducted on the third optical information recording medium having protective substrate thickness t3 (1.1 mm≦t3≦1.3 mm) by using n3$^{th}$ (n3 is a natural number) diffracted light of the light flux with wavelength λ3 generated by diffractive effects of the light-converging optical element in the case of using the optical pickup device.

15. The optical pickup device of claim 14, wherein magnification m3 of the optical system including the third light source up to the third optical information recording medium for the light flux with wavelength λ3 is made to satisfy −¼≦m3≦−¹⁄₁₀.

16. The optical pickup device of claim 14, wherein a combination of the n1, n2 and n3 is made to be any one of (n1, n2, n3)=(0, 1, 0), (2, 1, 1), (3, 2, 2), (5, 3, 3) and (8, 5, 4).

17. The optical pickup device of claim 14, wherein the light flux with wavelength λ3 is pass through the second correcting element.

18. The optical pickup device of claim 14, wherein the second light source and the third light source constitute a packaged light source.

19. The optical pickup device of claim 1, wherein a diffractive structure is provided on the second correcting element, and
the diffractive structure is provided on a plane of incidence and on a plane of emergence of the second correcting element.

20. The optical pickup device of claim 1, wherein the chromatic aberration of the first light-converging spot and the chromatic aberration of the second light-converging spot to be controlled within a range necessary for reproducing and/or recording of information, by controlling an absolute value of the chromatic aberration of the first light-converging spot to be 0.15 μm/nm or less and by controlling an absolute value of the chromatic aberration of the second light-converging spot to be 0.25 μm/nm or less.

21. An optical pickup device comprising:
a first light source emitting a light flux with wavelength λ1 (380 nm≦λ1≦450 nm);
a second light source emitting a light flux with wavelength λ2 (600 nm≦λ2≦700 nm);
a light-converging optical element having a diffractive structure through which the light flux with wavelength λ1 and the light flux with wavelength λ2 pass;
a first correcting element having a diffractive structure through which at least the light flux with wavelength λ1 passes;
a second correcting element through which at least the light flux with wavelength λ2 passes; and
a beam splitter that makes an optical path for the light flux with wavelength λ1 and that for the light flux with wavelength λ2 to agree with each other in terms of their positions;
wherein reproducing and/or recording of information is conducted on the first optical information recording medium having protective substrate thickness t1 (0 mm<t1≦0.7 mm), by the use of the light flux with wavelength λ1,
reproducing and/or recording of information is conducted on the second optical information recording medium having protective substrate thickness t2 (0.5 mm≦t2≦0.7 mm), by the use of the light flux with wavelength λ2,
at least one of the first correcting element and the second correcting element is arranged between the beam splitter and the first light source or between the beam splitter and the second light source,
the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and
an absolute value of chromatic aberration owned by the light-converging optical element itself is controlled to be 0.25 μm/nm or less for the light flux emitted from the second light source.

22. The optical pickup device of claim 21, wherein the second correcting element is provided with a diffractive structure, and
an absolute value of chromatic aberration owned by the second correcting element itself is controlled to be 3.5 μm/nm or less for the light flux emitted from the second light source.

23. An optical pickup device comprising:
a first light source emitting a light flux with wavelength λ1 (380 nm≦λ1≦450 nm);
a second light source emitting a light flux with wavelength λ2 (600 nm≦λ2≦700 nm);
a light-converging optical element having a diffractive structure through which the light-flux with wavelength λ1 and the light flux with wavelength λ2 pass;
a first correcting element having a diffractive structure through which at least the light flux with wavelength λ1 passes;
a second correcting element through which at least the light flux with wavelength λ2 passes; and
a beam splitter that makes an optical path for the light flux with wavelength λ1 and that for the light flux with wavelength λ2 to agree with each other in terms of their positions;
wherein reproducing and/or recording of information is conducted on the first optical information recording medium having protective substrate thickness t1 (0 mm<t1≦0.7 mm), by the use of the light flux with wavelength λ1,
reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and a sign for a value of chromatic aberration owned by the light-converging optical element for the light flux emitted from the first light source and a sign for a value of chromatic aberration owned by the light-converging optical element for the light flux emitted from the second light source are the same.

24. The optical pickup device of claim 23, wherein a value of chromatic aberration owned by the light-converging optical element itself for the light flux emitted from the first light source and a value of chromatic aberration owned by the light-converging optical element itself for the light flux emitted from the second light source are made to be positive.

25. The optical pickup device of claim 24, wherein a value of chromatic aberration owned by the second correcting element itself for the light flux emitted from the second light flux is made to be negative.

26. The optical pickup device of claim 23, wherein a value of chromatic aberration owned by the light-converging optical element itself for the light flux emitted from the first light source and a value of chromatic aberration owned by the light-converging optical element itself for the light flux emitted from the second light source are made to be negative.

27. The optical pickup device of claim 26, wherein a value of chromatic aberration owned by the second correcting element itself for the light flux emitted from the second light source is made to be positive.

28. The optical pickup device of claim 26, wherein a diffractive structure is provided on the second correcting element.

29. An optical pickup device comprising:
a first light source emitting a light flux with wavelength λ1 (380 nm≦λ1≦450 nm);
a second light source emitting a light flux with wavelength λ2 (600 nm≦λ2≦700 nm);
a light-converging optical element having a diffractive structure through which the light flux with wavelength λ1 and the light flux with wavelength λ2 pass;
a first correcting element through which at least the light flux with wavelength λ1 passes;
a second correcting element having a diffractive structure through which at least the light flux with wavelength λ2 passes; and
a beam splitter that makes an optical path for the light flux with wavelength λ1 and that for the light flux with wavelength λ2 to agree with each other in terms of their positions;

wherein reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and a sign for a value of chromatic aberration owned by the light-converging optical element for the light flux emitted from the first light source is different from a sign for a value of chromatic aberration owned by the light-converging optical element for the light flux emitted from the second light source.

30. The optical pickup device of claim 29, wherein a value of chromatic aberration owned by the second correcting element itself for the light flux emitted from the second light flux is made to be negative.

31. The optical pickup device of claim 29, wherein a diffractive structure is provided on the first correcting element.

32. A correcting element used in an optical pickup device as a first correcting element, wherein
the optical pickup device has
a first light source emitting a light flux with wavelength λ1 (380 nm≦λ1≦450 nm),
a second light source emitting a light flux with wavelength λ2 (600 nm≦λ2≦700 nm),
a light-converging optical element having a diffractive structure through which the light flux with wavelength λ1 and the light flux with wavelength λ2 pass,
the first correcting element having a diffractive structure through which at least the light flux with wavelength λ1 passes,
a second correcting element having a diffractive structure through which at least the light flux with wavelength λ2 passes, and
a beam splitter that makes an optical path for the light flux with wavelength λ1 and that for the light flux with wavelength λ2 to agree with each other in terms of their positions, wherein reproducing and/or recording of information is conducted on the first optical information recording medium having protective substrate thickness t1 (0 mm<t1≦0.7 mm), by the use of the light flux with wavelength λ1, reproducing and/or recording of information is conducted on the second optical information recording medium having protective substrate thickness t2 (0.5 mm≦t2≦0.7 mm), by the use of the light flux with wavelength λ2, at least one of the first correcting element and the second correcting element is arranged between the beam splitter and the first light source or between the beam splitter and the second light source, the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source, and an absolute value of chromatic aberration owned by the first correcting element itself is controlled to be 2.1 μm/nm or less for the light flux emitted from the first light source.

33. A correcting element used in an optical pickup device as a first correcting element, wherein
the optical pickup device has
a first light source emitting a light flux with wavelength λ1 (380 nm≦λ1≦450 nm),
a second light source emitting a light flux with wavelength λ2 (600 nm≦λ2≦700 nm),
a light-converging optical element having a diffractive structure through which the light flux with wavelength λ1 and the light flux with wavelength λ2 pass,
the first correcting element having a diffractive structure through which at least the light flux with wavelength λ1 passes,
a second correcting element through which at least the light flux with wavelength λ2 passes, and
a beam splitter that makes an optical path for the light flux with wavelength λ1 and that for the light flux with wavelength λ2 to agree with each other in terms of their positions,
wherein reproducing and/or recording of information is conducted on the first optical information recording medium having protective substrate thickness t1 (0 mm<t1≦0.7 mm), by the use of the light flux with wavelength λ1,
reproducing and/or recording of information is conducted on the second optical information recording medium having protective substrate thickness t2 (0.5 mm≦t2≦0.7 mm), by the use of the light flux with wavelength λ2,
at least one of the first correcting element and the second correcting element is arranged between the beam splitter and the first light source or between the beam splitter and the second light source,
the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source, and an absolute value of chromatic aberration owned by the light-converging optical element itself is controlled to be 0.25 μm/nm or less for the light flux emitted from the second light source.

34. A correcting element used in an optical pickup device as a first correcting element, wherein
the optical pickup device has
a first light source emitting a light flux with wavelength λ1 (380 nm≦λ1≦450 nm),
a second light source emitting a light flux with wavelength λ2 (600 nm≦λ2≦700 nm),
a light-converging optical element having a diffractive structure through which the light flux with wavelength λ1 and the light flux with wavelength λ2 pass,
the first correcting element having a diffractive structure through which at least the light flux with wavelength λ1 passes,
a second correcting element through which at least the light flux with wavelength λ2 passes, and
a beam splitter that makes an optical path for the light flux with wavelength λ1 and that for the light flux with wavelength λ2 to agree with each other in terms of their positions,
wherein reproducing and/or recording of information is conducted on the first optical information recording medium having protective substrate thickness t1 (0 mm<t1≦0.7 mm), by the use of the light flux with wavelength λ1,
reproducing and/or recording of information is conducted on the second optical information recording medium having protective substrate thickness t2 (0.5 mm≦t2≦0.7 mm), by the use of the light flux with wavelength λ2,
at least one of the first correcting element and the second correcting element is arranged between the beam splitter and the first light source or between the beam splitter and the second light source,
the first light-converging spot formed on the first optical information recording medium by n1$^{th}$ diffracted light (n1 is a natural number) of the light flux with wavelength λ1 generated by diffractive effects of the light-converging optical element and the second light-converging spot formed on the second optical information recording medium by n2$^{th}$ diffracted light (n2 is a natural number satisfying n1≠n2) of the light flux with wavelength λ2 generated by diffractive effects of the light-converging optical element are controlled to be within a range necessary for reproducing and/or recording of information in terms of chromatic aberration, and a sign for a value of chromatic aberration owned by the light-converging optical element for the light flux emitted from the first light source and a sign for a value of chromatic aberration owned by the light-converging optical element for the light flux emitted from the second light source are the same.

35. A correcting element used in an optical pickup device as a first correcting element, wherein the optical pickup device has
a first light source emitting a light flux with wavelength $\lambda 1$ (380 nm$\leq \lambda 1 \leq$450 nm),
a second light source emitting a light flux with wavelength $\lambda 2$ (600 nm$\leq \lambda 2 \leq$700 nm),
a light-converging optical element having a diffractive structure through which the light flux with wavelength $\lambda 1$ and the light flux with wavelength $\lambda 2$ pass,
the first correcting element through which at least the light flux with wavelength $\lambda 1$ passes,
a second correcting element having a diffractive structure through which at least the light flux with wavelength $\lambda 2$ passes, and
a beam splitter that makes an optical path for the light flux with wavelength $\lambda 1$ and that for the light flux with wavelength $\lambda 2$ to agree with each other in terms of their positions,
wherein reproducing and/or recording of information is conducted on the first optical information recording medium having protective substrate thickness t1 (0 mm<t1$\leq$0.7 mm), by the use of the light flux with wavelength $\lambda 1$,
reproducing and/or recording of information is conducted on the second optical information recording medium having protective substrate thickness t2 (0.5 mm$\leq$t2$\leq$0.7 mm), by the use of the light flux with wavelength $\lambda 2$,
at least one of the first correcting element and the second correcting element is arranged between the beam splitter and the first light source or between the beam splitter and the second light source,
the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration, and
a sign for a value of chromatic aberration owned by the light-converging optical element for the light flux emitted from the first light source is different from a sign for a value of chromatic aberration owned by the light-converging optical element for the light flux emitted from the second light source.

36. A correcting element used in an optical pickup device as a second correcting element, wherein
the optical pickup device has
a first light source emitting a light flux with wavelength $\lambda 1$ (380 nm$\leq \lambda 1 \leq$450 nm),
a second light source emitting a light flux with wavelength $\lambda 2$ (600 nm$\leq \lambda 2 \leq$700 nm),
a light-converging optical element having a diffractive structure through which the light flux with wavelength $\lambda 1$ and the light flux with wavelength $\lambda 2$ pass,
a first correcting element having a diffractive structure through which at least the light flux with wavelength $\lambda 1$ passes,
the second correcting element having a diffractive structure through which at least the light flux with wavelength $\lambda 2$ passes, and
a beam splitter that makes an optical path for the light flux with wavelength $\lambda 1$ and that for the light flux with wavelength $\lambda 2$ to agree with each other in terms of their positions,
wherein reproducing and/or recording of information is conducted on the first optical information recording medium having protective substrate thickness t1 (0 mm<t1$\leq$0.7 mm), by the use of the light flux with wavelength $\lambda 1$,
reproducing and/or recording of information is conducted on the second optical information recording medium having protective substrate thickness t2 (0.5 mm$\leq$t2$\leq$0.7 mm), by the use of the light flux with wavelength $\lambda 2$,
at least one of the first correcting element and the second correcting element is arranged between the beam splitter and the first light source or between the beam splitter and the second light source,
the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1$\neq$n2) of the light flux with wavelength $\lambda 2$ generated by diffractive effects of the light-converging optical element are controlled to be within a range necessary for reproducing and/or recording of information in terms of chromatic aberration,
an absolute value of chromatic aberration owned by the light-converging optical element itself is controlled to be 0.15 μm/nm or less for the light flux emitted from the first light source, and
an absolute value of chromatic aberration owned by the first correcting element itself is controlled to be 2.1 μm/nm or less for the light flux emitted from the first light source.

37. A correcting element used in an optical pickup device as a second correcting element, wherein
the optical pickup device has
a first light source emitting a light flux with wavelength $\lambda 1$ (380 nm$\leq \lambda 1 \leq$450 nm),
a second light source emitting a light flux with wavelength $\lambda 2$ (600 nm$\leq \lambda 2 \leq$700 nm),
a light-converging optical element having a diffractive structure through which the light flux with wavelength $\lambda 1$ and the light flux with wavelength $\lambda 2$ pass,
a first correcting element having a diffractive structure through which at least the light flux with wavelength $\lambda 1$ passes,
the second correcting element through which at least the light flux with wavelength $\lambda 2$ passes, and
a beam splitter that makes an optical path for the light flux with wavelength $\lambda 1$ and that for the light flux with wavelength $\lambda 2$ to agree with each other in terms of their positions,
wherein reproducing and/or recording of information is conducted on the first optical information recording medium having protective substrate thickness t1 (0 mm<t1$\leq$0.7 mm), by the use of the light flux with wavelength $\lambda 1$,
reproducing and/or recording of information is conducted on the second optical information recording medium having protective substrate thickness t2 (0.5 mm$\leq$t2$\leq$0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1≠n2) of the light flux with wavelength $\lambda 2$ generated by diffractive effects of the light-converging optical element are controlled to be within a range necessary for reproducing and/or recording of information in terms of chromatic aberration, an absolute value of chromatic aberration owned by the light-converging optical element itself is controlled to be 0.15 μm/nm or less for the light flux emitted from the first light source, and an absolute value of chromatic aberration owned by the light-converging optical element itself is controlled to be 0.25 μm/nm or less for the light flux emitted from the second light source.

38. A correcting element used in an optical pickup device as a second correcting element, wherein the optical pickup device has
- a first light source emitting a light flux with wavelength $\lambda 1$ (380 nm≦$\lambda 1$≦450 nm),
- a second light source emitting a light flux with wavelength $\lambda 2$ (600 nm≦$\lambda 2$≦700 nm),
- a light-converging optical element having a diffractive structure through which the light flux with wavelength $\lambda 1$ and the light flux with wavelength $\lambda 2$ pass,
- a first correcting element having a diffractive structure through which at least the light flux with wavelength $\lambda 1$ passes,
- the second correcting element through which at least the light flux with wavelength $\lambda 2$ passes, and
- a beam splitter that makes an optical path for the light flux with wavelength $\lambda 1$ and that for the light flux with wavelength $\lambda 2$ to agree with each other in terms of their positions, wherein reproducing and/or recording of information is conducted on the first optical information recording medium having protective substrate thickness t1 (0 mm<t1≦0.7 mm), by the use of the light flux with wavelength $\lambda 1$, reproducing and/or recording of information is conducted on the second optical information recording medium having protective substrate thickness t2 (0.5 mm≦t2≦0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1≠n2) of the light flux with wavelength $\lambda 2$ generated by diffractive effects of the light-converging optical element are controlled to be within a range necessary for reproducing and/or recording of information in terms of chromatic aberration, and a sign for a value of chromatic aberration owned by the light-converging optical element for the light flux emitted from the first light source and a sign for a value of chromatic aberration owned by the light-converging optical element for the light flux emitted from the second light source are the same.

39. A correcting element used in an optical pickup device as a second correcting element, wherein the optical pickup device has
- a first light source emitting a light flux with wavelength $\lambda 1$ (380 nm≦$\lambda 1$≦450 nm),
- a second light source emitting a light flux with wavelength $\lambda 2$ (600 nm≦$\lambda 2$≦700 nm),
- a light-converging optical element having a diffractive structure through which the light flux with wavelength $\lambda 1$ and the light flux with wavelength $\lambda 2$ pass,
- a first correcting element through which at least the light flux with wavelength $\lambda 1$ passes,
- the second correcting element having a diffractive structure through which at least the light flux with wavelength $\lambda 2$ passes, and
- a beam splitter that makes an optical path for the light flux with wavelength $\lambda 1$ and that for the light flux with wavelength $\lambda 2$ to agree with each other in terms of their positions, wherein reproducing and/or recording of information is conducted on the first optical information recording medium having protective substrate thickness t1 (0 mm<t1≦0.7 mm), by the use of the light flux with wavelength $\lambda 1$, reproducing and/or recording of information is conducted on the second optical information recording medium having protective substrate thickness t2 (0.5 mm≦t2≦0.7 mm), by the use of the light flux with wavelength $\lambda 2$, at least one of the first correcting element and the second correcting element is arranged between the beam splitter and the first light source or between the beam splitter and the second light source, the first light-converging spot formed on the first optical information recording medium by $n1^{th}$ diffracted light (n1 is a natural number) of the light flux with wavelength $\lambda 1$ generated by diffractive effects of the light-converging optical element and the second light-converging spot formed on the second optical information recording medium by $n2^{th}$ diffracted light (n2 is a natural number satisfying n1≠n2) of the light flux with wavelength $\lambda 2$ generated by diffractive effects of the light-converging optical element are controlled to be within a range necessary for reproducing and/or recording of information in terms of chromatic aberration, and a sign for a value of chromatic aberration owned by the light-converging optical element for the light flux emitted from the first light source is different from a sign for a value of chromatic aberration owned by the light-converging optical element for the light flux emitted form the second light source.

* * * * *